US010956572B2

(12) United States Patent
Mitola, III

(10) Patent No.: US 10,956,572 B2
(45) Date of Patent: Mar. 23, 2021

(54) DOMAIN-SPECIFIC HARDWIRED WEB BROWSER MACHINE

(71) Applicant: Hackproof Technologies Inc., Cocoa Beach, FL (US)

(72) Inventor: Joseph Mitola, III, Cocoa Beach, FL (US)

(73) Assignee: Hackproof Technologies Inc., Cocoa Beach, FL (US)

( * ) Notice: Subject to any disclaimer, the term of this patent is extended or adjusted under 35 U.S.C. 154(b) by 152 days.

(21) Appl. No.: 15/682,101

(22) Filed: Aug. 21, 2017

(65) Prior Publication Data

US 2018/0052999 A1 Feb. 22, 2018

Related U.S. Application Data

(60) Provisional application No. 62/377,912, filed on Aug. 22, 2016.

(51) Int. Cl.
*G06F 21/00* (2013.01)
*G06F 21/56* (2013.01)
(Continued)

(52) U.S. Cl.
CPC .......... *G06F 21/566* (2013.01); *G06F 21/568* (2013.01); *G06F 21/71* (2013.01);
(Continued)

(58) Field of Classification Search
CPC ........ G06F 21/566; G06F 21/71; G06F 21/76; G06F 21/568; G06F 2221/2119; H04L 63/145

See application file for complete search history.

(56) References Cited

U.S. PATENT DOCUMENTS 6,006,264 A 12/1999 Colby et al.
8,875,227 B2 10/2014 Kundu et al.
(Continued)

FOREIGN PATENT DOCUMENTS

CN 1059799 A 3/1992
CN 1467658 A 1/2004
(Continued)

OTHER PUBLICATIONS

Chia-Mei Chen; Wan-Yi Tsai; Hsiao-Chung Lin; "Anomaly Behavior Analysis for Web Page Inspection"; Sep. 2009; 2009 First International Conference on Networks & Communications; Conference Paper; Publisher: IEEE; pp. 358-363 (Year: 2009).*

(Continued)

*Primary Examiner* — Kendall Dolly
*Assistant Examiner* — Courtney D Fields
(74) *Attorney, Agent, or Firm* — Banner & Witcoff, Ltd.

(57) ABSTRACT

A domain-specific hardwired symbolic web browser machine is described that processes information via the hardwired mapping of symbols from one or more domains onto other such domains, computing and communicating with improved security and reduced power consumption because it has no CPU, no Random Access Memory (RAM), no instruction registers, no Instruction Set Architecture (ISA), no operating system (OS) and no applications programming. The machine provides web browser functionality including, for example, the display of web pages. In some embodiments, the machine has no unconstrained RAM into which malware may insert itself and needs no anti-virus software.

20 Claims, 20 Drawing Sheets

(51) Int. Cl.
    *H04L 29/06*     (2006.01)
    *G06F 21/71*     (2013.01)
    *G06F 21/76*     (2013.01)

(52) U.S. Cl.
    CPC ............ *G06F 21/76* (2013.01); *H04L 63/145* (2013.01); *G06F 2221/2119* (2013.01)

(56) References Cited

U.S. PATENT DOCUMENTS

| | | | |
|---|---|---|---|
| 9,246,523 | B1 | 1/2016 | Stopler et al. |
| 9,490,885 | B1 | 11/2016 | Zheng et al. |
| 10,013,384 | B1 | 7/2018 | Wang-Roveda et al. |
| 2009/0054016 | A1 | 2/2009 | Waheed et al. |
| 2011/0264721 | A1 | 10/2011 | Patel et al. |
| 2011/0302397 | A1 | 12/2011 | Mitola, III |
| 2012/0131316 | A1 | 5/2012 | Mitola, III et al. |
| 2013/0064176 | A1 | 3/2013 | Hsu et al. |
| 2013/0208647 | A1 | 8/2013 | Kottkamp et al. |
| 2014/0223561 | A1* | 8/2014 | Mitola, III .............. G06F 21/56 726/23 |
| 2015/0096006 | A1* | 4/2015 | Chu ...................... G06F 21/128 726/9 |

FOREIGN PATENT DOCUMENTS

| | | | | |
|---|---|---|---|---|
| CN | 1811630 | A | | 8/2006 |
| CN | 101236574 | A | | 8/2008 |
| CN | 102694756 | A | | 9/2012 |
| GB | 2546984 | A | * | 8/2017 ......... H04L 63/1433 |
| TW | 200937293 | A | | 9/2009 |

OTHER PUBLICATIONS

Perkowski, Marek Andrzej, "Learning Hardware," Jun. 24, 2010, retrieved from http://web.cecs.pdx.edu/mperkows/CLASS_VHDL_99/tran888/lecture008-learning-hardware.pdf, retrieved Jun. 13, 2014, pp. 1-119.

Perkowski, et al, "Evolvable Hardware or Learning Hardware? Induction of State Machines from Temporal Logic Constraints," Evolvable Hardware, 1999. Proceeding of the First NASA/DOD Workshop O.N. Pasadena, CA, Jul. 19-21, 1999, pp. 129-138.

Wikipedia, "Field-programmable gate array," Feb. 4, 2013, retrieved Jun. 13, 2013 from: http://en.wikipedia.org/w/index.php?title=Field=programmalbe_gate_array&oldid=536512233.

Jul. 2, 2014 (WO) International Search Report and Written Opinion—App. PCT/US2014/013337.

Jul. 30, 2015 U.S. Non-Final Office Action—U.S. Appl. No. 13/799,277.

Sep. 28, 2015 (WO) International Search Report—App. PCT/US2015/037182.

WebPHY DATABUS: "WebPHY DATABUS—A Web Server/Ethernet IP Core for FPGAs", Jun. 3, 2013, Retrieved from the Internet: URL: https:ljwww.youtube.com/watch?v=QQRmjNZXH5g, 1 page, retrieved on Sep. 17, 2015.

Magdalene, et al., "A Fpga Embedded Web Server for Remote Monitoring and Control of Smart Sensors Networks," Sensors, vol. 14, No. 1, Dec. 27, 2013, pp. 416-430.

Arab, Gawen, "Web Server on a FPGA, without CPU, only VHDL (French)," Jan. 29, 2010, Retrieved from the Internet: URL:https://www.youtube.com/watch?, v=7syu5E, retrieved on Sep. 17, 2015, 1 page.

Anonymous: "Anatomy of an HTTP Transaction—Web Performance Monitoring and Optimization," catchpoint.com; May 14, 2013, Retrieved from the Internet: URL:https://web.archive.org/web/20130514104338//http://blog.catchpoint.com/2010/09/17//anatomyhttp; [retrieved on Sep. 18, 2015] p. 1-4.

May 20, 2016 U.S. Non-Final Office Action—U.S. Appl. No. 14/321,097.

Wikipedia, "Field-programmable gate array," Feb. 4, 2013, retrieved Jun. 13, 2013 from: http://en.wikipedia.org/w/index.php?title=Field=programmalbe_gate_array&oldid=536512233.

Jan. 3, 2017 (WO) International Search Report and Written Opinion—App. PCT/US2016/056809.

Jan. 12, 2016 U.S. Final Office Action—U.S. Appl. No. 13/799,277.

Dec. 12, 2017—U.S. Non-Final Office Action—U.S. Appl. No. 14/825,813.

Apr. 19, 2017 (CN) First Office Action—App 201480019881.X, Eng Tran.

Jun. 7, 2018—U.S. Non-Final Office Action—U.S. Appl. No. 15/292,371.

Jan. 17, 2019—U.S. Notice of Allowance—U.S. Appl. No. 15/292,371.

Oct. 29, 2020—U.S. Non-Final Office Action—U.S. Appl. No. 16/400,207.

* cited by examiner

Fig 2A

Symbol a
2A10

2A20  ( )

2A30  '<title>'

2A40  "black"

2A31  'title' 'HACKPROOF'

2A41  'color'  "CHAR.black.FF"

2A00

2A50

2A51  (Thing)

2A52  (Thing [Place ... ])

2A53  {Path [Place1] .. [Place N]}

2A54  /Action (Actor) {Path [place (Object)]}\

2A55  <Cause (Actor) /Action \>

2A56  (Event [Place] (Time) /Action\)

Specification of a Web Browser Machine (WBM)

"A Web Browser Machine (WBM) shall accept TCP IP packets from a data input port; shall display via its display memory valid text, images, and other media according to HTML5 and CSS 3.0. It shall accept keystrokes from a keyboard, converting valid keystrokes to displayed characters and into Internet packets"

2B200

(Self (things (TCP IP (packet(message)))(keyboard(keystroke)) (input(data))
(CHAR ... (A.Z|a.z|0.9)(<b>bold-faced-font</b>)...)(display(memory))
[places [keyboard (keystroke)], [Ethernet[In(packet)]], [display[memory]]
{TOP    {[Ethernet[In([TCP[Port_80 [In (packet)]] → [CHAR(data)]] |
        [keyboard (keystroke)] → [CHAR(data)]}},
        {[[CHAR(data)]] → [display[memory]]} } )

©2017 Hackproof Technologies Inc.

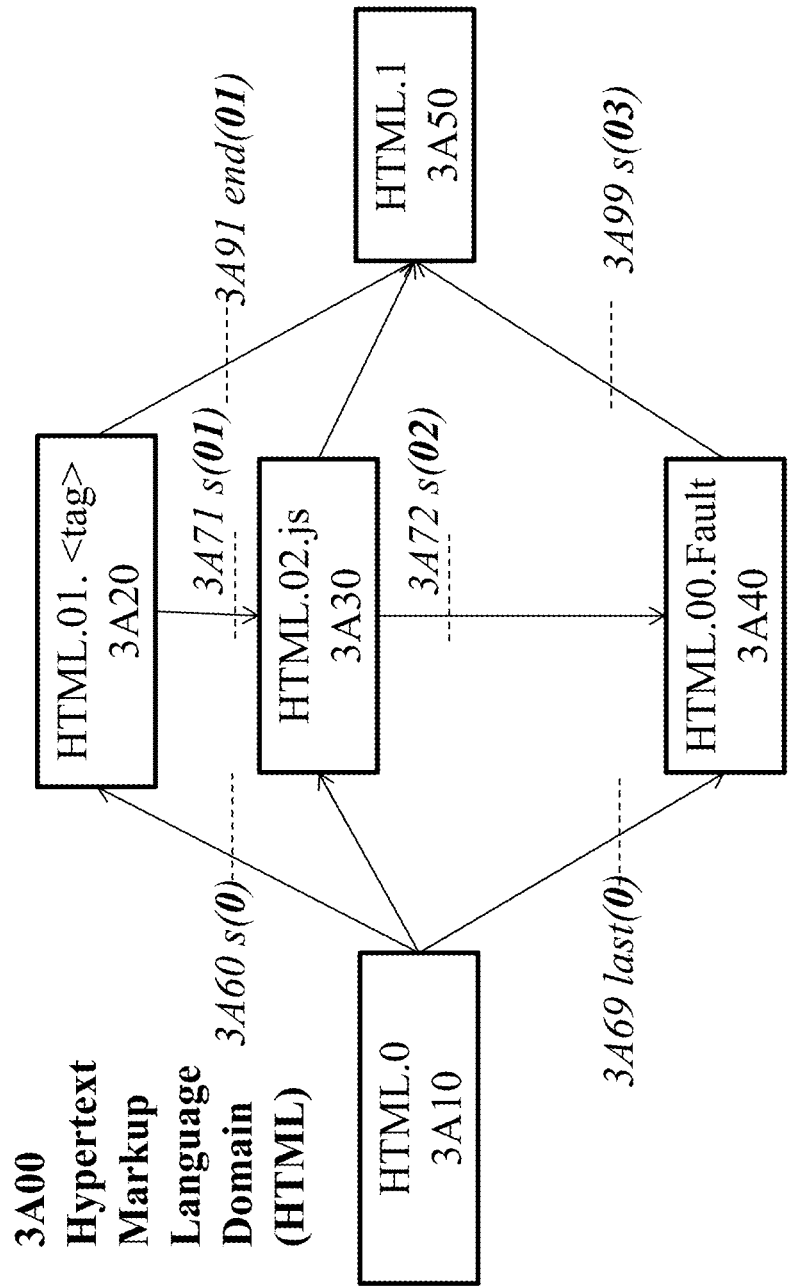

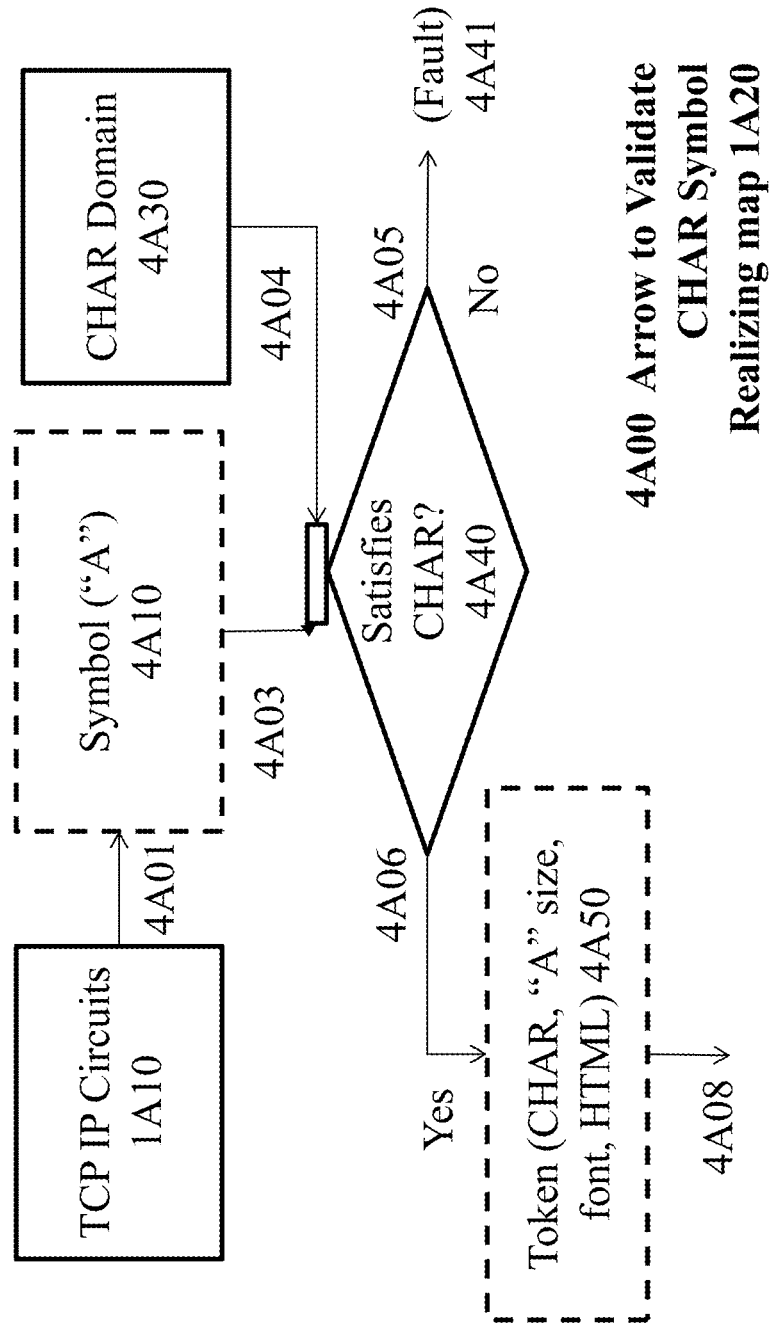

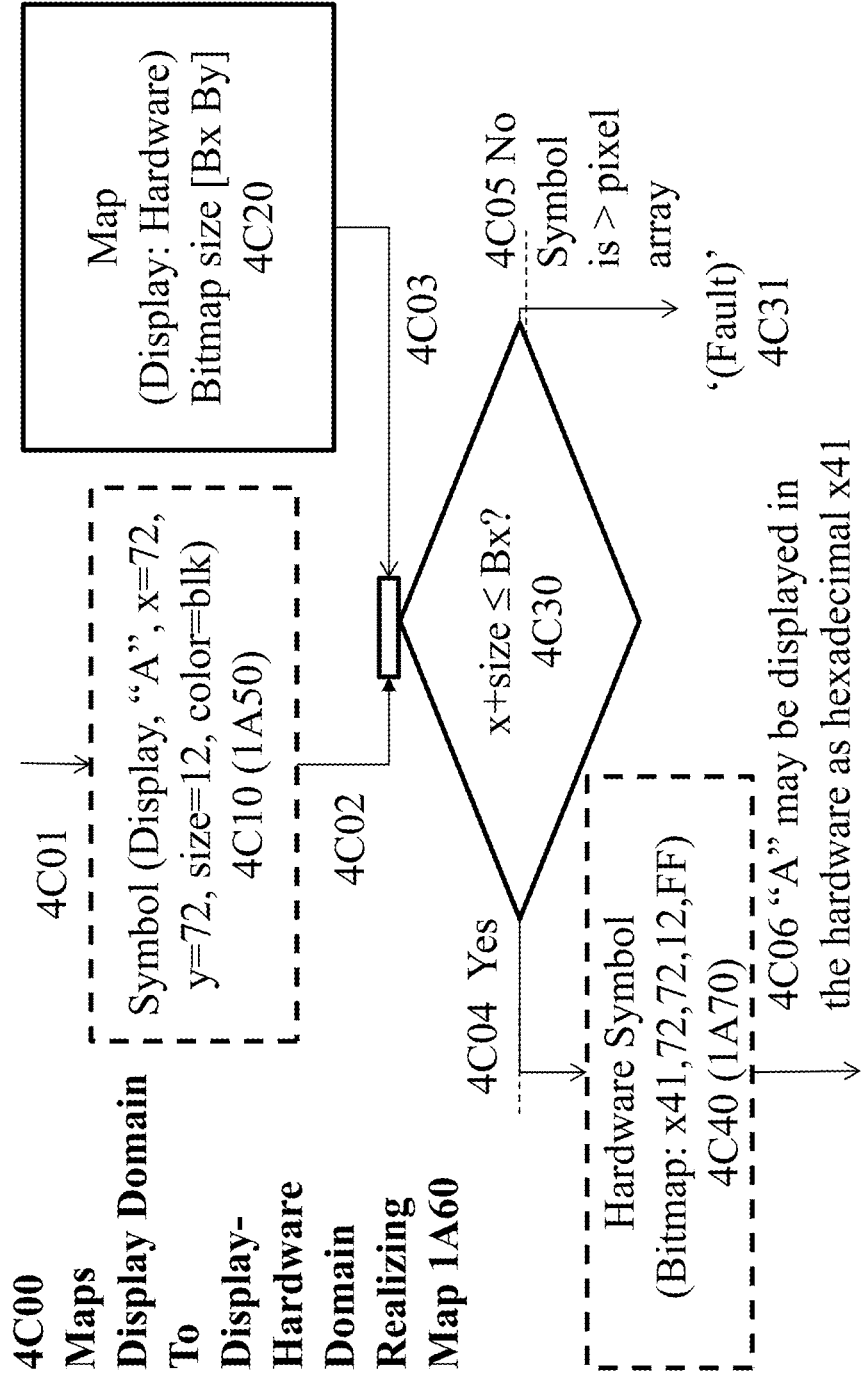

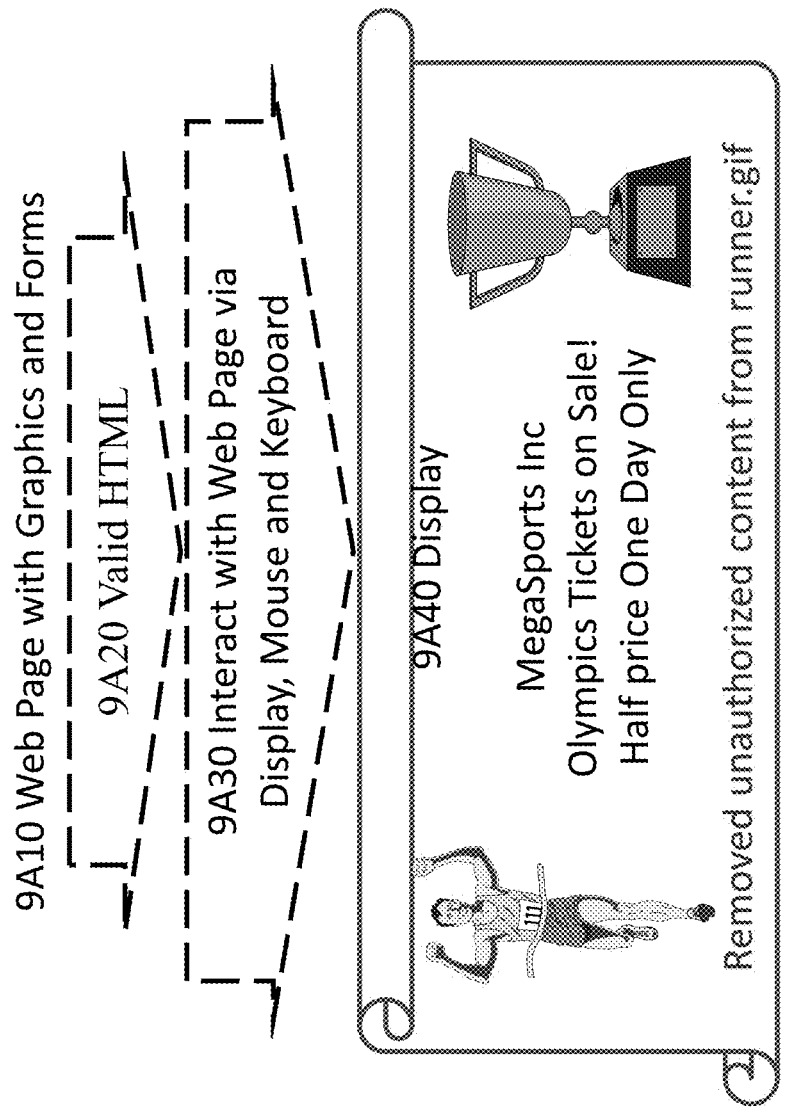

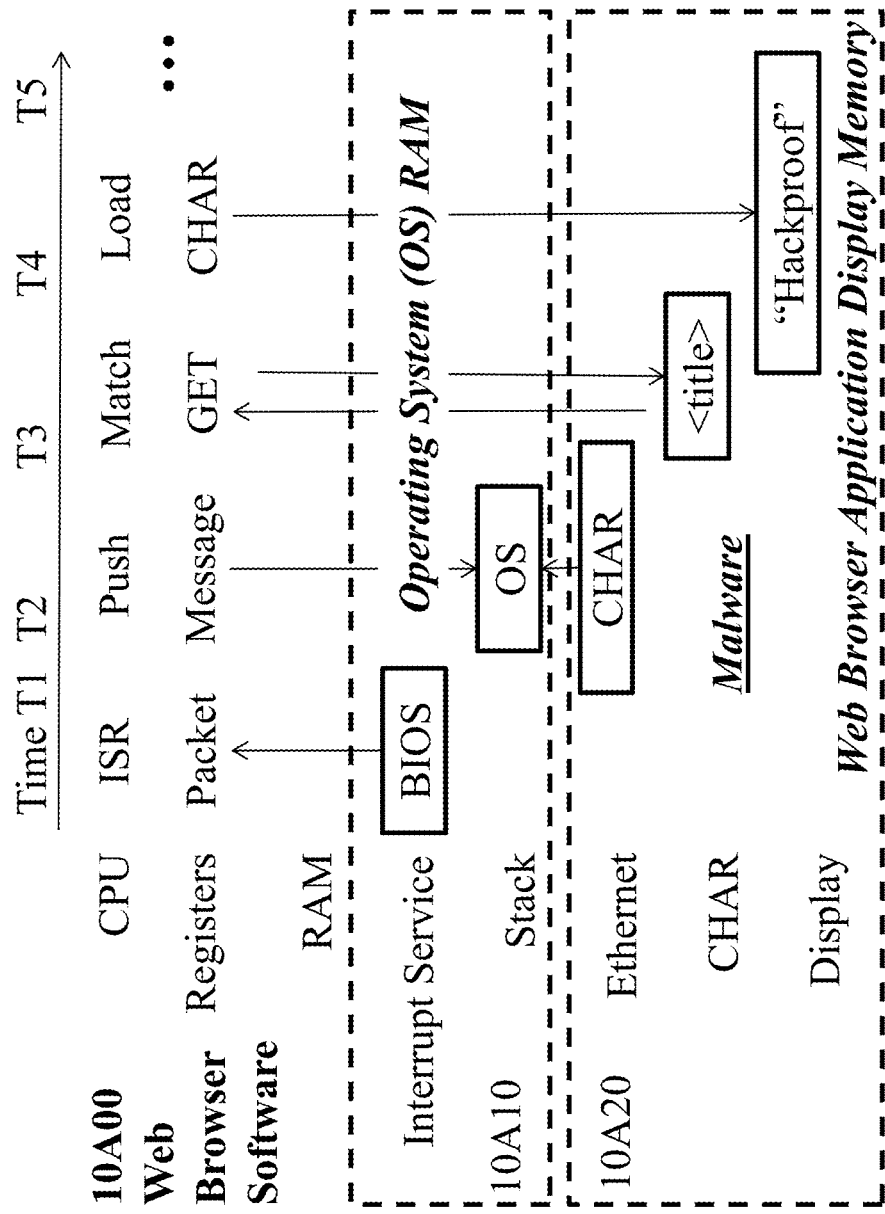

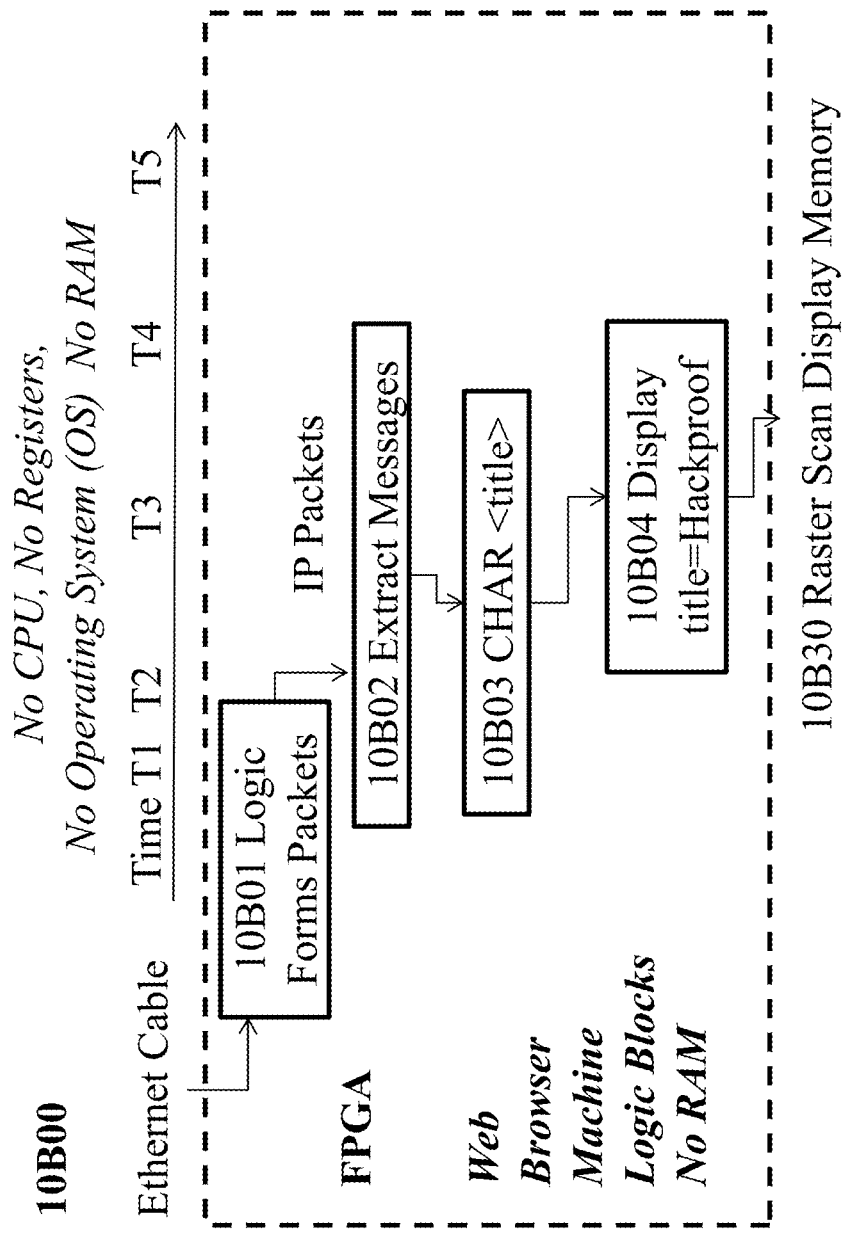

DOMAIN-SPECIFIC HARDWIRED WEB BROWSER MACHINE

CROSS REFERENCE TO RELATED APPLICATIONS

The present application claims the benefit of U.S. provisional application 62/377,912, filed Aug. 22, 2016, and entitled "A Domain-Specific Hardwired Web Browser Machine." The present application is related by subject matter to U.S. non-provisional application Ser. No. 13/799,277, filed Mar. 13, 2013, which is a non-provisional of U.S. provisional application Ser. No. 61/760,913, filed Feb. 5, 2013, entitled "A Domain-specific Hardwired Symbolic Learning Machine." The present application is also related by subject matter to U.S. non-provisional application Ser. No. 14/321,097, filed Jul. 1, 2014, entitled "Domain-Specific Hardwired Web Server Machine;" and to U.S. non-provisional application Ser. No. 14/825,813, filed Aug. 13, 2015, entitled "A Domain-Specific Hardwired eCommerce Learning Machine." The present application is also related by subject matter to U.S. non-provisional application Ser. No. 15/292,371, filed Oct. 13, 2016, which is a non-provisional of U.S. provisional application 62/240,724, filed Oct. 13, 2015, entitled "Soft-Wired Radio (SWR) Web Machine." Each of the above-mentioned applications is incorporated by reference in its entirety.

COPYRIGHT AUTHORIZATION

A portion of the disclosure contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This application is related to secure computing and communications.

BACKGROUND

Current Internet web browsers are software programs that enable a user to observe Internet content served by remote computers networked to the browser. The browser software may be hosted on a workstation, laptop, smart phone or other such computing device. The host computing device employs processor elements (PE) as a central processor unit (CPU) with an associated memory hierarchy of cache, random access memory (RAM); and in many cases, hard drive(s) and/or networked storage. PE's may be organized into a system on chip (SoC) or network on chip (NoC) of many PEs and memories, as a graphics processing unit (GPU), which may incorporate one or more application-specific integrated circuit (ASIC) co-processors, as a floating point unit, or may incorporate a reconfigurable co-processor (e.g. a field programmable gate array (FPGA)). Many such processors may be arranged in a warehouse of computers for remote configuration (e.g. by software tools like OpenStack), remote usage, and for lease in an arrangement termed cloud computing. A browser is local to a user, but clouds are remote from a user. A browser in an enterprise or cloud computing situation may present display images, the information content of which is generated remotely (e.g. in the cloud); in an arrangement, termed in the art a "thin client," the browser's host computer may not perform applications or store data locally. The browser's host computer itself, however, is general purpose in nature, having attack surfaces exploited by so-called man-in-the-browser (MitB) attacks.

Computer programming languages such as assembly languages, C, and C++ are known in the art for creating software packages offering basic capabilities (e.g., an operating system (OS) of a computing device such as Windows or Linux). Other software packages can be created using other languages including higher-level computer languages such as Java, Python, Ruby, TensorFlow, or JavaScript for programming higher level services (e.g., web services, big data analysis, and machine learning, for example). A virtual machine such as the Java Virtual Machine (JVM) may facilitate the use of a language like Java on a variety of computers having a variety of instruction set architectures (ISAs). More aggressive virtualization enables a current ISA to simulate an older, outdated ISA so that code written for that older ISA may run without modification "in the cloud". Web services may be viewed on a web browser on fixed and mobile devices like smart phones (e.g. viewing the content of a downloaded application, viewing content of a web-based game, or viewing the content of a web page). A web browser may be available on a laptop computer, desktop computer, or other device. An arrangement of computing hardware, OS, virtual machines, and software may be computationally inefficient (e.g., because of the overhead of pushing and popping interrupt stacks in random access memory for software, virtual machines, and OS functions). In other cases, factory automation as Programmable Logic Controllers (PLCs) may be controlled by servers in a factory network, the control of which is exerted by a browser located on a display and controlled by shop personnel, industrial engineers, etc. In another example, a browser may enable user control of information services of an automobile with one or more embedded computing systems (a smart car). Smart car services may include entertainment, radar alerts for proximity to other vehicles, and an autopilot function for a self-driving car. Many forms of graphical user interface (GUI) may be provided by a browser from data provided to the browser either locally by the host computer, or remotely by networked computing, or both. Such data may conform to a widely accepted data formats such as the Hypertext Markup Language (HTML), JavaScript Object Notation (JSON), RESTful (Reliable Exchange of State), and/or Cascading Style Sheets (CSS); alternatively data from proximate or global networks may have a format that is proprietary to some legal entity such as a manufacturer of products in a factory, or the manufacturer of a smart car. There are many other uses of browsers, the omission of which from this disclosure do not constitute excluding such uses from the uses of the invention disclosed herein.

Machines having an arrangement of CPU registers, instruction set architecture (ISA), and memory, may be commonly referred to as Turing-equivalent (TE), and may be able to compute anything that is possible to envision. The register sequences of CPUs, PEs, and GPUs can be manipulated by malware to include subsequences that violate the authorized behavior of programming executed by computers and other devices connected via one or more networks. For example, a compromised network may be used to commit various cybercrimes, such as the theft of wealth via one or more data transfers. Conventional cybersecurity measures (e.g., hardware roots of trust, sandboxes, virtual machines, anti-virus, firewalls, and monitors) have been incapable of providing a permanent solution to such cybercrime.

Many types of cybercrime exploit Turing-Equivalence, for example, by exploiting the vast degrees of freedom, uncontrolled states of registers and memory, and sequences of instructions (which may never terminate) that compose Turing-equivalent machines. In other words, Turing-equivalence of shared CPU hardware, open ended nature of register sequences, layering of software, and re-programmability of local and networked memory systems may provide opportunities for malware to perform computing tasks that are not authorized and may result in, among other things, financial or physical damage or payments for the avoidance of such damages (termed ransomware).

BRIEF SUMMARY

This Summary is provided to introduce a selection of concepts in a simplified form that are further described below in the Detailed Description. This Summary is not intended to identify key or essential features of the invention.

A hardwired web browser machine is described herein that is configured in a way as to preclude the entry of malware into itself, which reduces the effects of networked malware and provides a more permanent solution to cybersecurity. The hardwired web browser machine described herein (also referred herein as a web browser machine (WBM), or a domain-specific hardwired web browser machine) may include, for example, a computing machine in which open-ended register sequences and uncontrolled memory states of conventional computing and communications do not occur. In other words, the hardwired web browser machine described herein is, for example, a machine with no CPU, no RAM, no instruction registers and no ISA.

In some embodiments, a hardwired web browser machine may organize data into symbols and may limit the symbols to members of enumerated sets called domains. Domains may be application-specific and, thus, may be specific to the functions that a web browser is intended to perform (e.g., web browsing, PLC control, smart car services, etc.). For example, a web browser machine may include an input domain as a set of valid HTML pages for one or more web services. A web browser machine may include a web page domain as a set of valid HTML text, displayed as characters of a character domain CHAR, representing web content. Domains may be large but finite and limited in advance of usage. For example, HTML is a markup language that allows scripts. A script is a sequence of instructions of a computer language (commonly referred to as a scripting language) that may not be compiled into binary code like C or C++, and instead may be executed based on its textual form. JavaScript, Python, Perl, TCL and Ruby are a few examples of scripting languages used in HTML documents. Scripting languages are Turing-equivalent in that they are capable of computing anything imaginable. Thus, scripting languages may not be fully supported by a web browser machine. For example, scripting languages may cause the execution of arbitrary code that includes malware; may express infinite loops; and may have open-ended constructs as an array denoted [a, b, c, . . . ] with elements a, b, and c, but allowing an indefinite number of additional elements denoted by the ellipsis ( . . . ). Any loop or open-ended array may cause a stack-overflow in a conventional computer having a CPU, OS, and shared memory.

Similarly, a character displayed in a conventional browser display may be expressed as text or one or more characters (e.g., the character 'A' represented by hexadecimal character code x41) In display hardware, the text/characters become a set of black or white picture elements (pixels) in, for example, a 27x36 array of pixels forming the desired display characteristics (e.g., the shape of the letter A). Since there are 8 bits per character in the original ASCII standard, there are 128 characters in the ASCII mapping of character codes into a display bitmap. Display hardware may comprise a large array of pixels, such as 1366 pixels in width by 768 pixels in height. A character placed onto a display may have a size and an upper left corner (x,y) specified when placed into the display hardware array. Usually each pixel is colored, having one color of typically a 24-bit color wheel. A general purpose computer may not restrict character values processed for display, allowing the introduction of character-coded malware, but a web browser machine may limit characters accepted for display processing to a subset of the 128 possible characters. The subset of possible characters may be, for example, a set comprising small letters, capital letters and numbers. The various characters of the subset may be expressed compactly as the regular expression (RegEx) a-z|A-Z|0-9. The vertical bar ("|") indicates OR. Common punctuation symbols also may be displayed, but nulls (hex x00) and other non-display characters used in coding malware might not be allowed.

A web browser machine may, in some arrangements, prevent the above-noted problems with scripting languages by imposing hardware-defined limits upon the code, arrays, loops, character codes, and any other open-ended construct associated with a scripting language. While a web browser machine may impose hardware-defined limits on the length of an array, this does not mean that arrays are limited to having only a few elements. In some variations, a web browser machine may allow an array to have millions of elements. The limit of any array is dependent on an amount of memory a single instance of an array is allocated by a web browser machine. Additionally or alternatively, a web browser machine may impose hardware-defined limits on other aspects related to the processing of an array. For example, the web browser machine may enumerate which browser functions are able to process the array or access the memory allocated to the array. The web browser machine may enforce data isolation by processing the array according to a particular browser function, but denying any other browser function access to the array or any memory allocated for the array.

As will be further described below, the hardware-defined limits are represented by specifically configured circuitry of the web browser machine. For example, the web browser machine may incorporate circuitry configured to limit the size of an array. Based on the size limit, an array exceeding the specified size limit may generate a fault condition. A web browser machine may incorporate circuitry configured to limit a loop in some way so that it cannot be executed as an infinite loop at run-time, but may accomplish an authorized task in a specified number of iterations. For example, a web browser machine may "unwrap" a loop that needs 1000 iterations to accomplish something on 1000 text characters into 1000 parallel pipelines or into 1000 pipes connected in series to achieve the same logical function as the loop. The pipes and pipelines, which are one of the types of circuitry used in the web browser machine, are described in greater detail below. A web browser machine may substitute hardware circuit representation of loops for loops that are infinite in nature or are otherwise of an indefinite number of iterations. For example, a software listener may loop forever waiting for a mouse-click and a web browser machine may establish a hardwired circuit to indicate that a mouse button has been clicked and/or to initiate the processing of various pipes configured within the web browser machine. This arrangement may render the loop for a software listener unnecessary and a hardwired circuit may be termed a hardware-data map between a Hardware Domain and a Data Domain. In view of the above, a loop may be represented in hardware based on various types of circuitry, domains and maps. Further details of the types of circuitry, domains and maps used to represent a loop in a web browser machine will be discussed below.

A web browser machine may allow for the use of fixed symbols and variable symbols. Fixed (or constant) symbols may be stored into hardwired memory as read only memory (ROM). Variable symbols may be stored into memory blocks that may be isolated from each other and may not be randomly accessed. The fixed or constant symbols may also be found within a self-specification of a web browser machine, briefly noted herein as "(Self)" or a "(Self) description." (Self) may describe the intended information processing behavior of the device. (Self) may be written in a human language or a machine-readable language.

A web browser machine may represent an information processing operation or function as hardwired combinatorial logic termed a pipe circuit. A pipe circuit may be located between and connected to one or more pairs of domain-specific encapsulated objects. Domain-specific encapsulated objects may include, for example, a flip-flop, a register, and a memory block. Thus, instead performing information processing operations/functions by a processor executing instructions stored in memory, a web browser machine may perform the information processing operation/function using an arrangement of pipe circuits, which may be referred to as a pipeline. Each pipe circuit may map (via its circuitry) a domain-specific value of a symbol contained in an input variable object into an intermediate value and may produce a domain-specific symbol as a variable output object. The map of a pipe circuit may be hardwired to be consistent with a (Self) description. In some variations, a web browser machine may include two or more pipe circuits that are configured to perform an identical map, but each of the two or more pipe circuits may perform its map between different variable objects.

A web browser machine may accept external stimuli (e.g. in the form of text and multimedia content from one or more input ports) and process the stimuli to form a variable composite symbol termed a token. A web browser machine may accept an HTML page (e.g. from a start tag <html> to an ending tag </html>), process the HTML page to form a display token. A display token may be realized in a variety of ways including, for example, as text, as a bitmap, or as a signal representing one or more pixels for a display. A web browser machine may perform its processing by moving tokens, whether as data or as signals, systematically through its circuitry to result in output tokens that represent information for display. The information for display may be output from the web browser machine via one or more display ports associated with a display device (e.g., a port that causes the information to be stored in a memory associated with a display device). In this way, a web browser machine may cause the display of a web page on a display device.

The web browser machine may perform other operations/functions. For example, a keyboard attached to a web browser machine may generate input for the web browser machine and, responsively, the web browser may generate a token that represents a character corresponding to the key that has been pressed, as the "a" key. This token may be tested by a pipe circuit to determine whether its value is valid according to one of the domains. Upon passing a domain validation test, the token may be processed by various circuits of the web browser machine and may result in the display of the letter 'a' in an appropriate part of a display. In some variations, a token also may subjected to other tests. For example, if the token is to be included in an Internet Protocol (IP) packet that is to be transmitted over a network, the token may be tested for inclusion in a domain that restricts the content of an outgoing Internet Protocol (IP) packet. These and other details of the operations/functions of the web browser machine will be discussed below.

A pipe circuit may include a domain-enforcing circuit that may validate the conformance of a token to a domain (which has been hardwired into the machine, such as via a hardwired specification of such a domain in a (Self) description). Tokens and symbols entailed in token flow from input to output may be constrained via hardwired tests, e.g. of domain and for conformance to behaviors specified in a (Self) description.

Input stimuli forming tokens for display may be offered by one or more sensors or data communications interfaces such as a local area network or wireless link. Output tokens may be converted to text, graphics, voice, video, or other media (e.g. for external usage). The input ports, domains, maps, (Self) description, and output ports of such a machine may be immutable during operation, while allowing for extensibility during operation via hardwired fault management circuits operating according to a hardwired (Self) description. Variable objects may enable tokens to flow through the immutable maps to provide information processing services such as email, database, spreadsheets, Internet access (e.g. world wide web) and other valuable information processing services. A web browser machine may output the objects for display (e.g., to generate one or more bitmaps of characters and images on a display screen) and the output may correspond or be based on one or more tokens derived from HTML, JSON, scripts, CSS, graphics files and other information received via an input port of the web browser machine. A web browser machine may create such character, signals, and image bitmap objects via embedded devices including for example cameras (images, video clips), microphones (voice signals), touch sensitive display (encoded gesture signals), etc.

Thus, a web browser machine, which comprises hardwired connections and domain-specific functionality, may be one implementation of (or include aspects of) a Domain-specific User-defined Parallel Pipelined Learning (DUPPL) machine. In some embodiments, operating as a purposefully configured web browser may be the web browser machine's single function. To form the web browser machine, information processing functions may be hardwired into application-specific integrated circuits (ASICs), optical computing circuits, field-programmable gate arrays (FPGAs), and/or other circuits or computing devices. A web browser machine may be simple, operating within a limited domain embodied as a domain-specific device such as an ASIC. A web browser machine may be flexible, operating within a specified set of domains and maps embodied in a flexible logical device such as an FPGA. Multiple simple and flexible web browser machines may be interconnected by sharing domains. A collection of simpler devices, proximate or networked, may form a larger, more complex composite web browser machines capable of complex web browsing services. Nevertheless, the function of a given chip, network, or system and of a composite machine or network of web browser machines may occur within the immutable boundaries of a given domain or set of domains that may be embodied into a web browser machine via a (Self) description. The machine itself may be employed to limit its own behavior, realizing what is termed in the art self-control of an autonomous system.

Compared to a conventional Turing-equivalent computer, cybersecurity may be improved by the web browser machine's hardwired immutability of information processing, self-checking of domains, self-referential consistency of a (Self) description, hardwired constants, variable objects, and hardwired parallel pipelines. A web browser machine may need no virus protection because there is no unconstrained random access memory in which a virus may hide. A web browser machine may not be subject to malicious attacks, as man-in-the-browser (MITB) attacks that cause a user to observe false or misleading information in the display (e.g. so that the user is not able to behave appropriately). The widely reported Stuxnet malware, for example, displayed indications that centrifuges controlled by a PLC were operating normally when in fact the malware had driven the centrifuges outside of normal operating ranges. The PLC was reporting problems to the malware, but the malware displayed false data to the users via the browser. This resulted in the centrifuges breaking. Thus, a web browser machine that is in accordance with the various aspects described herein may neutralize a vast range of malware as computer viruses, keystroke loggers, worms, and advanced persistent threats.

BRIEF DESCRIPTION OF THE DRAWINGS

FIG. 2A illustrates example notations of symbols that may be used in a WBM according to various aspects described herein.

FIG. 2B illustrates example notations for a (Self) description of a WBM, which includes both a notation having a human-readable text form and a notation having a human-machine readable and understandable symbolic form.

FIG. 3A illustrates an example of a domain for a WBM that provides examples of variable objects for a Hypertext Markup Language domain, HTML.

FIG. 4A illustrates an example block diagram for a validation arrow for a WBM that validates a domain.

FIG. 4C illustrates an example block diagram for a validation arrow for a WBM that validates a symbol of a display domain prior to transmission to a display device.

FIG. 9A illustrates a generalized flow chart of a WBM that receives an HTML page and responds with a bitmap hardware display of a sports web page containing malware.

FIG. 10A illustrates a time line for the operation of a WBM on a general purpose computer having random access memory and an operating system.

FIG. 10B illustrates an example time line of operation of WBM having no random access memory or operating system.

DETAILED DESCRIPTION

Introduction to Terminology

Figure 1A:
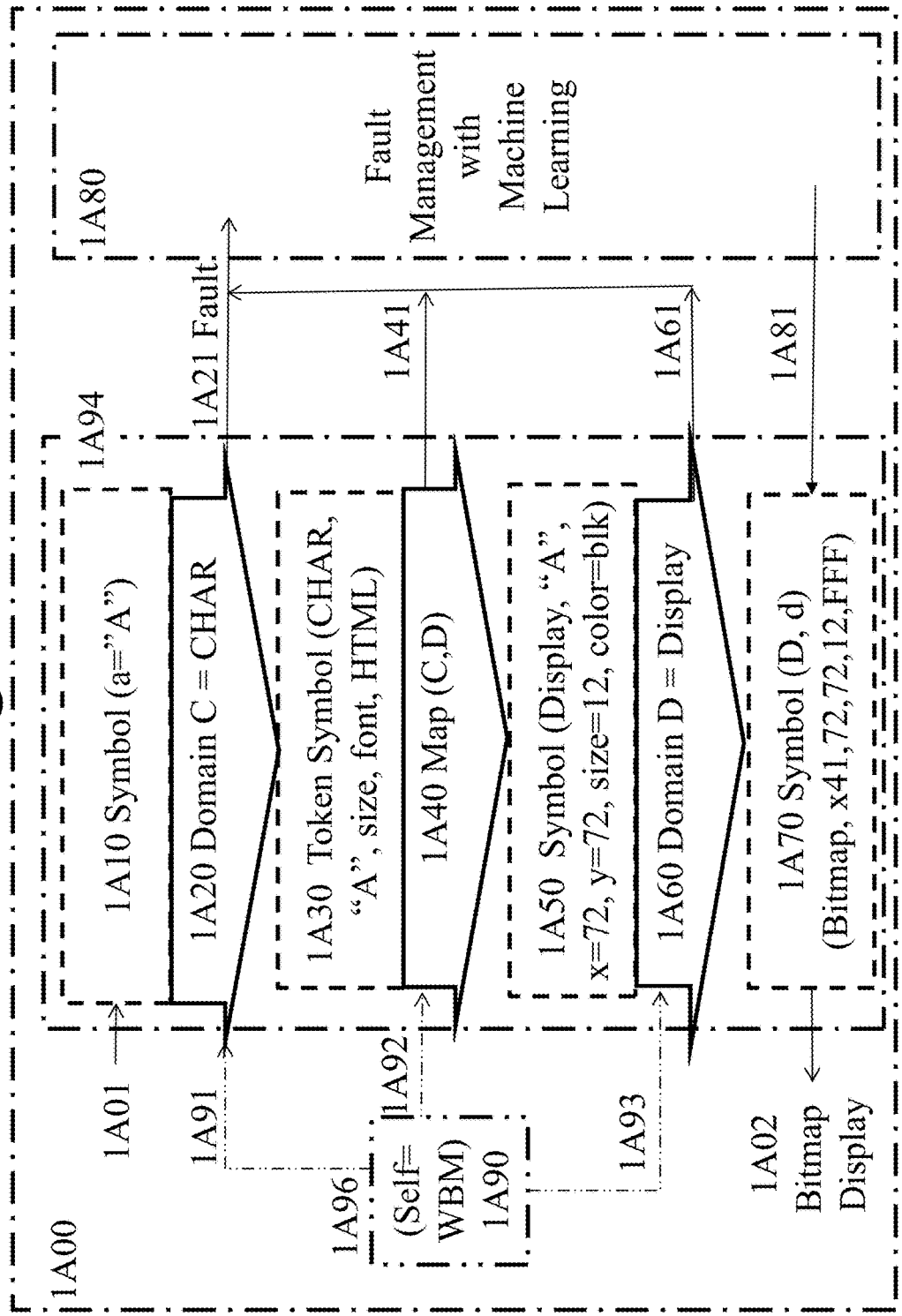
FIG. 1A illustrates an example block diagram of an apparatus configured to operate as a WBM according to one or more aspects described herein.

As discussed above in the brief summary, information processing functions of a WBM may be hardwired into the pipes of ASICs, optical computing circuits, FPGAs, and other circuits or computing devices that may comprise a machine. Information of a WBM is stored and processed through the circuitry of a WBM in various forms. Such information forms may include: symbols, objects, tokens, domains, and a self-description, which is referred herein as "(Self)".

A symbol is textual data, the basic unit of information representation that conforms to a defined logical structure and is expected to be a member of a domain. For example, a symbol could be text such as "Account Number"; a symbol could be "IP Address 1.2.3.4.5"; a symbol could be "flagUSA.jpeg:[image data]", wherein [image data] is the actual image data for flagUSA.jpeg. A WBM may express a symbol as a value of an object. Values of objects may be fixed and constant, that of a single symbol hardwired into a WBM; or objects may be variable, capable of representing alternative symbols of a domain. For example, an object named "Legal Display" may have a fixed value "Account Number" indicating that displaying an Account Number is allowed; a variable object named 'IPAddress' may have a variable value "1.2.3.4.5". A WBM will know how to process a symbol according to its meaning. A symbol can be used in various ways throughout a WBM. In some instances, a symbol may be able to "flow" through the circuitry of a WBM. When a symbol "flows" through the circuitry of a WBM, it is referred to as a token. A token named Display may have a value Account Number, forming a token (Display Account Number) that may flow through a comparison with a "Legal Display", flowing further to generate an (Account Number) display token, the value of which may be provided to a display port or to a bitmapped memory portion of a display. Hereinafter, the term display memory shall refer to any of a number of alternative forms of memory in which, once data is stored, the display device generates a display based on the stored data (e.g. display pixels having the intended color, size, font, orientation, style, etc., as specified by the contents of the symbol generating the bitmap pixels for the display hardware to display).

An object is the basic unit of information storage and retrieval. An object may contain exactly one symbol. An object may be variable, containing alternative different symbols, or an object may be fixed, containing exactly one symbol for the life of the WBM of which it is a part.

A domain is a listing of symbols. Each symbol that is listed is a member of that domain. For example, if a CHAR domain provides a listing of "A-Z" and "0-9", both Regular Expressions (RegEx) then the symbol "A" and the symbol "5" both are members of the domain. In this example, a domain listing both "A" and "5". indicates that both characters are accepted by the WBM. A character x00, the ASCII NULL character might not be included in such a CHAR domain of a WBM. A WBM will know how to process a domain, for example, to test a symbol to determine whether the symbol is a member of the domain. For example, if the symbol to be tested is "x00" it would not be a member of the above domain. However, if the symbol was "7" it would be a member of the domain. A domain may be abstract as a protocol or may be concrete as the contents of a specific image such as a flag of the USA. A domain may refer to things that are external to a WBM as a place via GPS coordinates or to things that may be internal to a WBM, as (Self) hardware domain that may include a listing of the circuit boards of the (Self).

A (Self) may include a description of what the WBM can and cannot perform. The (Self) may include all domains and, thus, indicates all symbols that may validly occur within a WBM. A WBM will know how to process the (Self) to, for example, identify a particular domain in order for a symbol to be validated against the domain. In some arrangements, (Self) is hardwired into the WBM and cannot be changed throughout the life of the circuit.

As is apparent from the above description and the additional details described below, a WBM is comprised of various circuits including memory blocks and pipes.

A memory block may be comprised of various circuitry components necessary for storing the symbols. For example, with respect to ASIC and FPGA designs, a memory block may be comprised of various flip-flops, registers, wires and the like. In general, a memory block stores a symbol. In some instances, the memory block may act as a constant (e.g., the stored symbol cannot be changed physically nor electronically for the life of the circuit); a variable object (e.g., have contents that can change throughout the life of the circuit, such as by storing different symbols at different points in time); and an address (e.g., store a symbol that refers to the location of another memory block). Thus, a memory block may be a circuit representing an information object whether fixed or variable that may have as its contents at a given time a symbol of a given domain.

Additionally, memory blocks may be associated with other memory blocks. For example, a constant (e.g., memory block acting as a constant) may be associated with a variable object (e.g., memory block acting as a variable object) such that the constant provides a label or name for the variable object. The constant may act as an address that defines where the variable object in located in the memory space of the WBM e.g., so that a third memory block containing a token may access the variable object with the constant as its address. For example, a memory block having the fixed value 'Legal Display' may be adjacent to a memory block having the fixed value 'Account Number'. The adjacency causes an association between the symbolic name 'Legal Display' with the value 'Account Number. In a related example, a memory block having the fixed value 'Display' may be adjacent to a memory block having the variable value "Social Security Number", which associates the symbolic name 'Display' with the value "Social Security Number" in this example, not legal to display. By use of the hardwired memory blocks (and other aspects described herein), a WBM may defeat an attempt for a remote entity (e.g., a person or machine) to obtain sensitive personally identifiable information (PII) as a Social Security Number. Whether Social Security Number is contained in a domain of valid Display may be determined by the WBM according to the identity of the user of the WBM, according to login, biometrics, etc. Thus a WBM may display the Social Security Number of the current user, but not the Social Security Number of other users, according to the (Self) description. The memory block associations of a WBM may be defined in the (Self) via a one or more symbols and/or domains.

The definitions of the symbols and/or domains in the memory blocks form a part of the reasons a WBM is able to defeat attacks/hacks that a browser in a conventional computing device is susceptible to. As mentioned above, conventional computing devices are susceptible to attacks that inject malware into a web browser. One example is a Stuxnet attack. Malicious code may be inserted into a browser so that the malware can modify a data display field of a browser so that the displayed values are in error as intended to induce erroneous action by the user. For example, in the Stuxnet attack, the status of the Siemens PLC was changed from a value that was out of specification (e.g. 120% spin rate) to display a value that was within specification (e.g. 90% spin rate). Simply checking for a valid range of a value is insufficient to defeat an attack. In contrast, a WBM is resilient against the implantation of malicious code and can be configured to perform similar functions as the devices in the Stuxnet attack. Thus, when a WBM receives a value of 120% from the PLC, its hardware will match a hardwired (Self) domain of alert values (e.g., of the "Spin Rate" domain) and cause an alert to be raised (e.g., via an audible beeping, via display of a red symbol, etc.) to the actual inappropriate spin rate in the display hardware. Thus, a user can be alerted to the potentially destructive operating conditions of the centrifuge. The hardwired processing of a WBM (e.g. the processing of the values receives from a PLC into the appropriate audible or visual output) is immutable, not modifiable by data or instructions presented from a remote source. Thus, a WBM is able to defeat malicious attacks as MITB attacks.

A pipe is circuitry that is located between at least two memory blocks. The circuitry of a pipe may be comprised of logic necessary to perform one or more designated functions, such as AND-gates, OR-gates, NAND-gates, inverters, and the like. The designated functions are generally related to the browser function being implemented by the WBM. Pipes may take the contents of one memory block as input, process the input according to, for example, a map between two symbols or an arrow between two domains, to produce output that is stored in a memory block. For example, a pipe may include circuitry that validates that a symbol is a member of domain. In a specific WBM, for example, a "Account Number" value of a 'Legal Display' memory block defining a 'Legal Displays' domain may be compared with a "Social Security Number" value of a 'Display' token, resulting in a failure of a token to conform to the 'Legal Displays' domain. A pipe may include circuitry that maps a symbol from one domain to a different domain. In a specific WBM, for example, an "Account Number" value of a 'Display' token conforming to a 'Legal Displays' domain may be mapped to a (Display) object having a value "Account Number" comprised of characters of a Characters (CHAR) domain, resulting in a success of the token to conform to the CHAR domain to display the label "Account Number" in a hardware bitmap domain for viewing. Where a pipe includes circuitry that maps a symbol from one domain to a different domain, that pipe may be referred to as a map.

The terms described above will be used throughout the disclosure when describing various embodiments of a WBM. Additional details of the circuitry used in a WBM also will be provided in connection with the various embodiments of a WBM. Additional details of the various forms information may take when stored or processed in a WBM also will be discussed in connection with the various embodiments.

Each circuit of a WBM may be associated an information processing purpose and function. The purpose and function of a memory block circuit may be to represent an information object that may have a fixed symbolic name and that may contain a symbol as its value. The purpose of a pipe may be to map a symbol of an input memory block into a resulting symbol of an output memory block. Further, additional circuits or information forms, or variations on the above discussed circuits and information forms, may also be introduced in connection with the various embodiments of a WBM described herein.

FIG. 1A, WBM Domain-Specific Hardwired Symbolic Web Browser Machine

For ease of understanding the hardware of a WBM, various examples herein will utilize a web page display application. Usage of this example application does not constrain the applicability of this disclosure to any other applications or from enumerating any other domain that may be required for a WBM implementing another application. For example, the basic hardware model of WBM may be used to display a page of a spreadsheet or status of an electric power grid, industrial controls of a factory floor, or a database of credit cards. In a spreadsheet example, Domain A={Row, Column}, which would be rows and columns of a spreadsheet to be displayed by a WBM. In an industrial controls application, a 'Speed' domain may indicate percent of rated speed (e.g. of an electric motor from 0% to 150% of rated speed) with values between 0 and 90% included in a 'Safe Speeds' domain and with values between 91% and 150% included in a 'Excessive Speeds' domain. Any Speed % exceeding a 150% maximum reportable by a PLC might be mapped to a 'Speed Error' domain. Thus, an application may comprise a set of domains indicative of status displayed by a WBM to a user. The use of a WBM to process IP packets from a PLC on a factory floor to display PLC status to a user may reduce vulnerabilities of factory-floor networks to malware.

FIG. 1A illustrates an example domain-specific hardwired symbolic web browser machine (WBM) apparatus, also referred herein as a WBM or WBM apparatus. FIG. 1A, in particular, illustrates a method of organization of the logic circuits of a WBM, allocating example logic functions of a WBM 1A00 to example pipes 1A94, 1A96, and 1A80 of logic circuits. Logical features of an apparatus may, for example, include a (Self) symbol 1A90 that may employ symbol notation to express the logic of the WBM; an application logical element 1A94 that may realize a web browser display function; and a fault management logical element 1A80 that may specify logic relating to logical errors that may be termed faults. An input network 1A01 may provide input data to an application logical element 1A94. An input data analysis logic circuit 1A10 may obtain from an input network 1A01 an input symbol. The input symbol for circuit 1A10 is shown as symbol a, which has an example textual value of "A" (briefly, "a='A'" in the drawing). A symbol, a, may be part of a larger sequence of symbols, e.g. comprising a web page description in HTML for a web page display application. A map circuit 1A20 may test a symbol, a, for conformance to a Domain C, of a map circuit 1A20 (e.g., a domain of characters acceptable for display processing, briefly, CHAR); a map circuit 1A20 may produce a token symbol (CHAR, "A" size, font, HTML) associating a character A to be displayed, with a Domain CHAR in an HTML character sequence, instantiating, for example, size of the letter A in pixels, font; and other characteristics (for simplicity not shown at 1A30) such as color of the letter; direction of the sequence of letters in which the letter A may occur, and other features of the letter A; may be provided by map circuit 1A20. A map circuit 1A40 may connect an input Domain C=CHAR to an output Domain D=Display Memory at 1A50 briefly Display, accepting a symbol "A" to generate a resulting symbol d=(Display, "A", x=72, y=72, size=12, color=blk), that may comprise a text character expressing a part of a web page such as a the A in "HACKPROOF". A symbol d may represent a name refer to a text character to conform to a Domain D, Display, that may comprise a physical display memory at 1A02 that may be continuously scanned to express information on a display screen. A map circuit 1A60 may test d for conformance of d to a logical address (x,y), where x and y comprise the location of the upper left corner of the character A in a bitmap display, along with a binary value for the character A, e.g. hexadecimal x41 in 8 bit ASCII coding. A symbol d of Domain D, Display, having a size=12 points and a color black=FFF, for example. Logic of a circuit 1A70 may convert a symbol d=(Bitmap x41, 72, 72, 12, FFF) having a bitmap value x41 (corresponding to the letter "A"), x and y locations, font size, and color FFF=black, a form suited for a display memory. Circuit 1A70 may be connected to output circuit 1A02, which may transfer processed character data to a display memory 1A02.

Thus, FIG. 1A illustrates one of the many possible web browser display functions that may be implemented using a WBM. As a general overview, via the processing of the various symbols, logic circuitry 1A94 may accept a web page expressed in HTML as input at 1A01 and may generate output data displayed in a display memory at 1A02. The output circuit 1A02 may transfer the output data to a display memory, so that a display is generated on a display device. Other portions of the WBM may perform additional operations associated with the web browser functions. For example, a fault management logic element 1A80 may determine the way in which a WBM 1A00 responds to logic errors termed faults that may be detected, for example, in maps 1A20, 1A40, or 1A60, conveyed to circuits 1A80 via fault indicator circuits 1A21, 1A41, 1A61, such as by not processing any 8 bit data elements that fail the test for the C=CHAR domain and thus are faults. In other embodiments circuits 1A80 may respond to a given symbol having a given fault with a corrected symbol at 1A81. Such fault management responses may be according to methods and processes of DUPPL machines. In some embodiments, a (Self) symbol 1A90 may indicate the logic of maps 1A20, 1A40 and 1A60; and of circuits 1A10, 1A30, 1A50, and 1A70 containing symbols; in some embodiments a (Self) symbol 1A90 may comprise and inform documentation that may be represented externally to a WBM apparatus; in some embodiments a (Self) symbol 1A90 may be realized in a logic circuit of a WBM apparatus.

In order for pipe segment 1A40 to satisfy the conditions of being an arrow of category theory, the symbol 1A50, which results from Map(1A30, 1A50), must be a member of Domain 1A50. Therefore, pipe segment 1A40 may validate symbol 1A50 as a member of Domain 1A50 of logical addresses of locations of a display memory into which text, images, video clips, streams, and other such content may be placed, briefly a Display Domain. As with pipe segment 1A20, Map(1A30, 1A50) that is performed by pipe segment 1A40 may be subject to faults, such as the failure of a circuit. Therefore, a pipe segment 1A50 may detect faults, such as failure of the contents of variable memory block 1A50 to conform to a Display Domain. In response, a pipe 1A40 may clear a memory block 1A50, causing map 1A94 not to display input symbol a, such as via logic circuits 1A40, 1A50, 1A60, and 1A70 to a display via circuits 1A02.

If symbol 1A50 is validated by pipe segment 1A40, the result may be provided to a display via circuits 1A50, 1A60, 1A70 and 1A02. Similar to memory block 1A10, a memory block 1A50 may be isolated from all of the other memory blocks. Additionally, a memory block 1A50 may not be accessed randomly. Preventing random access to a memory block may limit a WBM to only the domains embodied in circuits 1A20, such as of a Domain CHAR and of circuits 1A60 of a bitmap hardware Display Domain for presenting remote web pages via the browser functionality of the WBM. In other words, a WBM may be considered domain-specific.

A memory block 1A50 may be validated by circuits of a pipe 1A60 for membership in a bitmap hardware Domain Display and thus may connect to an output symbol 1A70 that may further comprise a circuit that may deliver content based on a symbol provided via an IP input port 1A02 of a network. For convenience of reference, an input port 1A01 corresponding to "Port 80" of an IP network 1A01 and an output port 1A02 corresponding to a display memory of an attached display 1A02 may be associated into an input-output map to display the input of IP packets to the WBM display.

Accordingly, a WBM performs information processing through an arrangement that processes symbols that are stored in various memory blocks, which may be isolated from other memory blocks and the contents of which may be obtained through various pipe segments. To contrast the differences between a WBM and a conventional computer, in a conventional computer, such data would be generated in registers of a CPU and subsequently stored in a random access memory (RAM). However, within a WBM, there may be a rigorous flow of valid information via tokens from a specific input port to a specific output port through a sequence of isolated memory blocks. The pipe segments of a WBM (e.g., pipe segments 1A20 and 1A40 of FIG. 1A) may transform data of a memory block (e.g. 1A10) via hardwired logic and store the resulting data in a second memory block (e.g. 1A30). The logic of a pipe may correspond to instructions of a conventional computer but be embodied as circuitry. By hardwiring the logic into a pipe, the function transforming memory is immutable. Multiple pipes may form a unidirectional portion of circuitry (e.g., tokens only flow one way through the circuitry) that may be referred to as a pipeline. In various arrangements, pipelines may include various numbers of pipe segments, but may not form loops. Looping behavior may be achieved by the regular transformation of inputs to outputs via a flow of tokens through the parallel pipelines of core circuits 1A00 and via networks 1A01 and display 1A02. Such flow of tokens may incorporate user interaction, e.g. via a keyboard input (not shown in this figure) to update the state of memory of various blocks of a machine. A circuit representing (Time) may provide an input to a WBM at a regular time interval. A (Self) 1A90 may specify a time interval. WBMs may be paired so that one WBM provides inputs to another WBM, input ports attached to output ports establishing a flow of tokens in a looping arrangement between such machines that may be constrained to domains and maps of each machine with respect to the other.

Figure 1B:
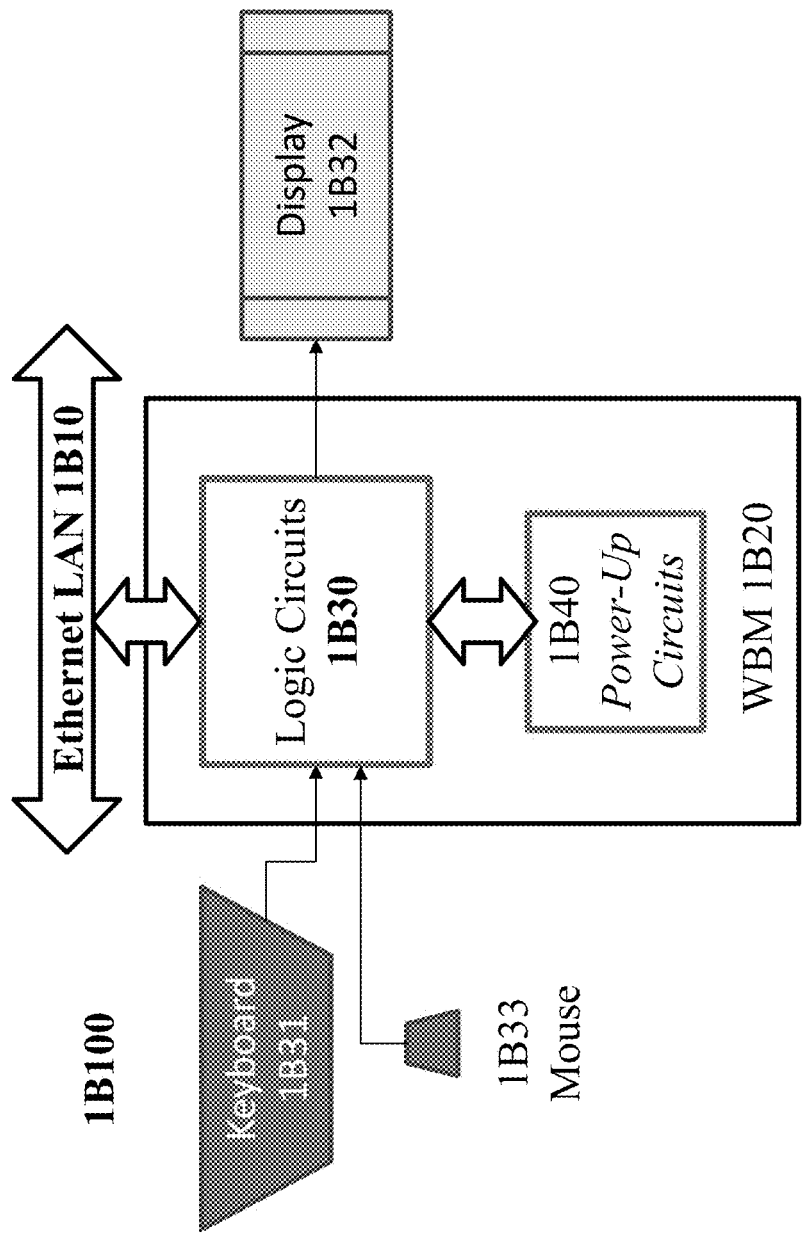
FIG. 1B illustrates a block diagram of a hardware configuration for a WBM according to various aspects described herein.

FIG. 1B, Example WBM Environment

FIG. 1B illustrates an example environment 1B100 where a WBM apparatus may be used to receive and display the contents of a web page and to interact with such a web page. Network environment 1B10 may include a local area network (LAN) such as an Ethernet LAN or wireless network, such as WiFi, connecting a WBM 1B20 to a networked device (not shown in the figure) such as a computer or cloud network. A networked device may contain an application such as a web server that may provide a web page via such network connections. A WBM 1B20 may comprise one or more logic circuits 1B30 that may realize logic needed to display web pages including circuitry needed to provide the WBM 1A00 of FIG. 1. Additionally, a WBM environment for a WBM 1B20 may incorporate a keyboard 1B31, a mouse 1B33 (and other input sensors such as camera or microphone); and a hardware display unit 1B32 (and other output actuators such as loud speakers) providing physical inputs and outputs for web browser display functionality. Additionally, a WBM environment for a WBM 1B20 may incorporate power-up circuits 1B40 that may be configured to initialize a WBM 1B20, e.g. as needed for a field programmable gate array (FPGA) upon power-up according to an example pattern of FPGA circuits disclosed hereinafter. In an environment 1B100, input may enter WBM 1B20 via a network input 1B10 via, for example, an Internet Protocol (IP) port associated with an Ethernet LAN (e.g. port 80, which is commonly used for requesting and receiving web pages) or wireless network (e.g. WiFi). Input to a WBM may include text, graphics, video clips, or digital streaming media (e.g. from a wireline network or wireless device or network). Text may comprise web pages, such as text using a hypertext markup language (HTML) to express one or more pages to display (e.g. displayed according to logic circuits 1A94 of FIG. 1A).

A WBM 1B20 may comprise a hardwired machine that may, for example, be realized in a field programmable gate array (FPGA) chip. A WBM FPGA chip 1B30 may be initialized at power up by circuits 1B40 specifically designed to load an FPGA personality into a WBM FPGA chip 1B30. Power-up circuits 1B40 may comprise a general purpose computer that is not connected to any device or network and that may contain data as a bit map for an FPGA; as the text of a web page; as an IP address; and as other data needed at the initialization of FPGA logic circuits 1B30 realizing logic 1A00 of FIG. 1A. Power-up circuits 1B40 are known to those skilled in the art as appropriate to load an FPGA chip at time of powering up an FPGA chip. An example pattern of circuits to be loaded at such time are illustrated in circuits described in conjunction with FIGS. 5C, 6, and 7.

Circuits, inputs, outputs, computing, communications, and power supplies of a WBM 1B100 may be ergonomically designed to fit in one's pocket, to fold up for transit, to slide into a slim case, and otherwise to be pleasing to sight and touch and convenient to own and operate. Inputs of a WBM 1B100 may be hard wired to recognize a user via video camera and voice; outputs may be hard wired to interact with a user in a particular way, enabling a WBM to recognize when it is in use by a user defined in the hardware (Self) as the owner, for example, or as a certain user. Biometric inputs such as reading finger prints on a touch screen may be hard wired into a (Self) according to which a WBM environment 1B100 may include one or more users recognized to the WBM (Self) 1A90.

FIG. 2A, Symbol Notation for a WBM

FIG. 2A illustrates symbol notation for a WBM. In particular, a fixed symbol 2A31 may express a fixed item such as the text characters 'HACKPROOF' which may be the exact text expressing a title of an HTML page in a TCP IP packet from a remote web server. A notation having single quotes around its object, such as '<title>', may express a constant symbol 2A30. A variable symbol 2A40 may represent a value that may be defined at some point in the future and that may be subject to change, such as "black" as a value of a color of a character to be displayed, e.g. 'color' having a hexadecimal value FFF. A symbol notation having double quotes may place double quotes around its object, such as "color" indicating an unknown color. An association 2A31 of a fixed and variable symbol may indicate that a memory block 2A31 may have a name in single quotes that may contain a fixed value in single quotes, such as a memory block named 'title' containing a fixed value 'HACKPROOF, i.e. nine text characters. An association 2A41 of a fixed and variable symbol may indicate that a memory block 2A41 may have a name, 'color', in single quotes that may contain a variable value, such as a memory block named 'color' containing a variable value of the color of a character that may designate an arrangement of data (e.g. "CHAR-.black.FFF", which includes a hexadecimal value for the character domain CHAR's color black, hexadecimal FFF) according to usage of a bitmap display in communication with output port 1A02 of FIG. 1A.

A WBM may be described further via symbols 2A50 in terms of things, places, paths, actions, causes, and events. A WBM (Self) 1A90 may be a (thing) 2A51 according to symbols 2A50 noted as (Self (WBM)) by which a WBM may know that it comprises a WBM. A WBM (Self) may further express ownership according to a place in the self-description termed a slot in some object-oriented languages, such as (Self [owner 'joe']) 2A52 where the concept of ownership of the (Self) may be expressed briefly as a place [owner] 2A52 in the (Self) for the name of the owner, in this example the name 'joe'. Thus, a place owner may contain the name of a thing, joe as in (Self [owner 'joe']). As another example, a token of data may be expressed according to symbols 2A50 as a data thing, briefly, (token) according to 2A51. An HTML token expressing a title of an input of IP packets may be expressed according to symbols 2A50 as '(<title>HACKPROOF</title>)' at 2A51 wherein symbols <title> and </title> may be included in an HTML domain that may be a place of the self, (Self [HTML . . . <title>title</title> . . . ]), expressed as symbols 2A52 in the hardware of a WBM. A token (<title>HACKPROOF</title>) may be a value of a data input thing (data) that may have a value (data <title>HACKPROOF</title>) that may move from a memory block through a pipe according to a movement of (data) down a {path} according to notation 2A53. A {path} may comprise a first check for conformance of (data) to a Domain CHAR, e.g. according to a pipe 1A20 by which (data <title>HACKPROOF</title>) may match symbols (Self [CHAR . . . A-Z|a-z|0-9 . . . ]) in which a match of symbols 'H', 'A', 'C', 'K', etc. to symbols A-Z|a-z|0-9 may establish that (data) expresses that the characters 'HACKPROOF" that is acceptable for display, e.g. resulting in a symbol CHAR, A, at x, y, with a given size and color having an associated value 'A' at 1A30, expressed symbolically as (Display [(x,y,size) 'HACKPROOF']) where a character of the title of a web page expressed in HTML may be internalized as a member of the WBM domain CHAR that may be contained in a memory block 1A30. A further map 1A40 may apply logic to transfer (Display [(x,y,size) 'HACKPROOF'])) to a display memory 1A02 according to a Display domain D at 1A60 having a [place] in the hardware known to the (Self) as (Self[display-memory[width height]) or (Self[display-memory[(0,0,12)(HACKPROOF)]]) according to the movement of (data) down a {path} for clarity of explanation named 'display-HTML' expressed according to symbols 2A50 as 2A53 {[1A10], [1A30],[1A50],[1A70]}. A WBM (Self) may know to move (data) down a path according to an action/Action (Actor) {Path [place (Object)]}\ 2A54 for displaying HTML according to/display (1A20) {display-HTML [1A10 (data)], [1A30(CHAR)], [1A50 (symbol)], [1A70 (display)] } \ according to which an arrow (1A20) initiates the movement of (data) from a memory place 1A10 through other memory places [1A30] and [1A50] to a display place [1A70], completing the display-HTML action expressed according to symbols 2A50. Usage of symbols 2A10 through 2A50 may compactly express an arrangement of objects and arrows termed a category.

Put briefly, a category may refer generally to a collection of objects and arrows having particular algebraic structure (e.g., an identity map exists for each object of each arrow of a category). An object of a WBM may represent an object of a category comprising similar objects. A collection of pipe circuits of a WBM may represent an arrow of category theory (an example of which is termed a morphism in other branches of mathematics). The pipe segments along with the memory blocks (e.g., those blocks acting as variable objects) may realize the mathematical structure of categories with finite limits. By realizing the mathematical structure of such finite limit categories, a WBM may simplify testing of conformance of a WBM to a specification of intended behavior of a WBM, and may increase information security.

Further, due to the formulation and construction of a WBM, in at least some embodiments, a WBM may realize its symbols 2A00 and functions 1A00 in an FPGA chip 1B30 that contains no shared registers, no random access memory (RAM), no shared central processing unit (CPU) or other processing elements (PEs) of a Turing computer, and no stored program memories of any sort (e.g., no operating system, no applications programming). Despite not containing these components of a conventional computing device, a WBM may perform information processing via symbols, hardwired circuitry that map the symbols according to the domains of the (Self) descriptions, e.g. using symbol notation 2A00, e.g. embodied in an FPGA chip 1B30, and memory blocks storing the symbols that operate as the input, intermediate values, stored values, and output for the hardwired connections. Accordingly, a WBM, for example, may supply the contents of a web page without fear of a malicious software agent entering the WBM to change the web browser function in such a way as to assist malware via the unauthorized use of the hardware, e.g. as was the widely reported intent of the Stuxnet malware.

A WBM may be embodied in an ASIC and/or FPGA, and the examples throughout this disclosure are described in connection with an FPGA. However, embodiments of a WBM could be implemented using different computing devices, including optical computing, optical storage devices, optical switching; analog or digital charge coupled devices, and the like.

FIG. 2B, Example Symbol Notation of a WBM Self-Description

FIG. 2B illustrates a symbol notation for a (Self) description of a WBM having a form 2B100 of a document and having a form 2B200 of a symbol. The scroll indicating a document 2B100, for example, illustrates a specification of a WBM in text as it may be convenient for usage as a system specification. According to the method of symbols of this invention, there may be a mathematical relationship of domains, maps, and arrows of a WBM specification and of a (Self) symbol further describing a WBM. For example, according to 2B100, a WBM may be specified as a machine that "shall accept TCP IP packets from a data input port, or keystrokes from a keyboard; it shall display via its display memory the corresponding text, images, and other media according to HTML5 and CSS 3.0." Accordingly, a symbol 2B200 may express a specification in symbol notation. For example employing symbol notation of FIG. 2A, a thing may be noted as (thing) 2A51. A (Self) thing may itself contain more specific things 2A51, such as via notation 2A51: (Self (things (TCP-IP (packet (message)). In this example the (Self . . . ) is a (thing) 2A51, the notation for which extends between the two outer parenthesis of a (Self . . . ) symbol. A further symbol (things . . . ) within a (Self . . . ) symbol may list symbol notations corresponding to (objects) of the self, such as a (TCP-IP (packet)) thing that further may contain a (message). A (TCP-IP) thing may refer to a hardware input port, for example, that may produce a (packet) that may be a data thing, for example, that may further contain a (message) thing that also may be data. A (Self) symbol notation may indicate further that a (Self) may contain other things such as a (keyboard) hardware thing that may express one or more (keystroke) data things, symbolically according to 2A51 (keyboard(keystroke)). A (Self) further may contain a collection of data things organized into a data domain such as (CHAR) that may correspond to an industry standard, e.g. ASCII codes, expressed according to symbols 2A00. A CHAR domain may include data things expressed in patterns of symbols that may facilitate case-based machine learning disclosed further below, such as an HTML markup pattern (<title>title</title>) that may be employed by a case based reasoning (CBR) pipe of a WBM as a pattern for matching a text string "<title>HACKPROOF</title>" to a data thing of a (Self) such as (<title>title</title>) by which a CBR may infer that the title of the document is the sub-string "HACKPROOF," each character of which is in a CHAR domain. Other patterns as (<b>bold-faced-fonts</b>) may be obvious to one skilled in the art from the <title> markup example. Further things of a (HWM) (Self) may identify hardware things such as a (display(memory)) according to symbols 2A51.

A (Self . . . ) may incorporate further notation regarding places 2A52, FIG. 2A, that may refer to specific details of a logical circuit of a (Self). In 2B200, there may be [places . . . ] that may refer, for example, to an Ethernet port 80 circuit with a WBM 1A00 of FIG. 1 having an Ethernet port within its input logic 1A01, i.e. acting as an input that may be expressed as a symbol '(Self . . . [Ethernet[In [Port_80]]] . . . )'. In some embodiments, a (Self) notation may correspond to a circuit 1A90. In some embodiments, a (Self) notation may correspond to documentation. In circuit and documentation usage of symbol notation, a pair of outer parenthesis of the (Self . . . ) notation may indicate the entirety of the (Self). In this example, the Ethernet is expressed a [place] 2A52 of the (Self). A symbol "[In[" of a lager Ethernet port symbol 2B200 may express the input feature of the Ethernet with respect to the (Self). In this example, the symbol "In" is a fixed symbol that may be expressed as notation 'In' according to symbolic notation. Thus, a more explicit symbol for Ethernet port 80 may include many single quotation marks, such as ('Self' . . . ['Ethernet']['Input']['Port_80'] . . . ] . . . ). However, for the greater clarity of improved readability, a simplified symbol notation (Self) may refer to a more explicit symbol notation ('Self'). A simplified notation 2B200 may refer to constant symbols. A symbol notation 2B200 for a WBM may include other places that may correspond to logic of a WBM, such as a place for [memory] that may correspond to logic of a bitmapped display by which such a WBM may display HTML multi-media web content to a user. Another symbol for a place of a WBM may include a domain, such as a place [CHAR], that may list the elements of a Domain CHAR, such as A-Z and 0-9. A symbol notation 2B200 may include a place [Display] in which there place may be a CHAR object, such as (HACKPROOF). So a symbol notation for a (Self) may incorporate a variety of symbols that may express a specification.

A flow of information through a WBM may be expressed in a (Self) symbol 2B200 as a {path . . . } 2A53 according to which a thing such as an (IP packet), or more simply (packet), may flow, e.g. from an input port to a CHAR domain causing a related flow, e.g. of a (Web Page) to a display hardware memory that is bitmapped via hardware to a display. According to notation 2A00, a {path} may be named (e.g. a top level path from input to output may be named {TOP . . . }). A top level path may include other paths that may correspond to maps 120, 140, and 160 of a WBM 100. Such maps noted by corresponding paths may in turn correspond to circuits of pipes that may realize the logic of maps, e.g. of maps 1A20, 1A40, and 1A60 of FIG. 1A. A top level path {TOP . . . } may express itself as a sequence of lower level paths. For example, a path {TOP} may express more specifically {TOP{[Ethernet[In([TCP[Port_80 [In (packet)]]→[CHAR(data)] . . . }. An alternative input may be expressed by including a logical "OR" symbol as "|" in such an arrangement of symbols. An alternative path for CHAR data then may be expressed further after the OR symbol as [keyboard (keystroke)]→[CHAR (data)}}, completing the input paths expressed in 2B200. Following a path, a further path {[CHAR(data)]]→[display[memory]]} may express symbolically how a CHAR domain may be mapped via a pipe 1A60 to an element of hardware such as a display memory. A final "}" may express the completion of the TOP level path in symbol notation 2A53. In such a case, the scope of the top level path extends from the first bracket, {, to the last bracket,}. A circuit 1A93 from a (Self) circuit 1A90 to a map 1A60 may establish a logical relationship between the functions of a map 1A60 and the symbols of a path {[CHAR(data)]]→[display[memory]]} of a (Self) 1A90.

Thus, a {TOP} path may comprise paths to convert messages or keystrokes to CHAR(data) and then to display the validated CHAR(data) in a display memory. An equivalent (Self) notation may express a path {TOP} as a sequence of these paths, i.e. {TOP {GetPage}{DisplayPage}}. In various implementations, it may be convenient for a (Self) circuit 1A90 of FIG. 1A to connect via circuits 1A91, 1A92, and 1A93 to map 1A20, 1A40, and 1A60. In various implementations it may be convenient to express a (Self) symbol in documentation as a guide for circuit design.

There may be mathematical relationships between a specification 2B100 and a symbol 2B200. One such mathematical relationship between a word, "valid", in a specification 2B100 and a symbol 'CHAR' in a symbol 2B200 may be termed a one to one mapping (briefly, 1:1). One such mathematical relationship between a specification 2B100 and a symbol 2B200 may be that a specification and a symbol are complete with respect to each other such that a symbol may be complete with respect to a specification and a related specification may be complete with respect to a corresponding symbol. A mathematical relationship of completeness may be termed mapping a specification ONTO a symbol and mapping a corresponding symbol ONTO a corresponding specification, briefly ONTO. There may be a mathematical relationship between such 1:1 and ONTO relationships that it does not matter whether one begins with a specification or begins with a symbol, both relationships 1:1 and ONTO apply; a correspondence may be termed that 1:1 and ONTO each may have inverses.

There may be a further mathematical relationship between a symbol and an item of hardware such that for each circuit in hardware there is a corresponding symbol. There may be a further mathematical relationship between an item of hardware and a corresponding symbol such that for each constituent symbol of a given symbol there corresponds a circuit of such hardware; a mathematical relationship between symbol and hardware then may be 1:1, ONTO, and have inverses. Constructing an item of hardware according to a symbol such that there may be 1:1, ONTO, and inverse mathematical relationships may embody mathematical properties of a symbol into such hardware. For example, a symbol may express a finite domain such as the set of valid character data (CHAR); corresponding hardware may embody a symbol (e.g. as 'CHAR') and as a list of CHAR codes that such hardware will display, such as 'A-Z|a-z' and '0-9'. Such explicit finiteness may impart advantages to hardware. For example, if malware expresses itself to the hardware as an HTML request that codes malware into a character string, a map of the hardware, not finding the malware CHAR expression in its finite domain CHAR, may respond to the malware characters as a fault or error (e.g., not displaying it because an invalid CHAR expression was received).

FIG. 3A an Example WBM Domain: HTML

As explained above, a symbol for a place of a WBM may include a domain, such as a symbol for a place [HTML]. The symbol for the place [HTML] may contain symbols for the things contained in such a Domain, such as for tags like '<title>' and '<b>' for boldface (e.g., [HTML(<title> . . . ) (<b> . . . )]). FIG. 3A illustrates example circuits of a WBM domain using HTML as an illustrative WBM data processing domain. Circuits of a domain [HTML] may be termed circuits for a hypertext markup language (HTML) domain 3A00; circuits of a domain for example may include a circuit 3A10 that embodies a fixed symbol 'HTML.0' that may indicate a circuit for an HTML domain; circuits of a domain for example may include a circuit 3A20 that embodies a fixed sequence number 01 and that further embodies a fixed object, HTML.01.<tag> embodying a fixed text value, '<tag>;' circuits 3A20 may incorporate a [list] of specific symbols for specific tags such as [tag (title) (b) (p) . . . ] where a circuit connected to a <tag> circuit 3A20 may match any <tag> listed in the [tag] list, as a tag <p> known by one skilled in the art of HTML to express the start of a paragraph; a list of <tag> types may comprise a sub-domain of HTML. The expression of HTML tags as a domain of the form of FIG. 3A, e.g. named HTML<tags> may have a starting element HTML<tags>0.0 with circuits listing the elements of a sub-domain, as well as a terminal element HTML<tags>0.1 according to circuit designs.

Circuits of an example HTML domain 3A00 may include a circuit 3A30 that embodies a fixed sequence number 02 and that further embodies a fixed object, HTML.02.js, embodying a fixed text value, 'js;' circuits of a 'js' member of an HTML domain may further express JavaScript that is listed in a place [js] of a circuit 3A30 such as 'autocomplete' (e.g. [js autocomplete.js]). Circuits of an HTML domain map may recognize an HTML input 'autocomplete.js' in a token in a way that may cause a WBM to generate an (autocomplete) token for each applicable character, of a domain CHAR of FIG. 3B, typed by a user from the keyboard. A realization of autocomplete.js may achieve the autocomplete.js function in hardware without interpreting any JavaScript code. In fact a WBM may be physically incapable of interpreting JavaScript code, having no CPU, no registers, no operating system, no compilers, and no JavaScript interpreter, but it may recognize HTML JavaScript expressions to provide a js function via hardware and may do so accordingly. A js domain may be realized as a subdomain HTML.js of an HTML domain.

Circuits of an example domain 3A00 may include other types of HTML text domains as a JavaScript Object Notation (JSON). JSON provides hash tables and lists that may be realized in circuits having no CPU, OS, or JavaScript interpreter. Other aspects of HTML may be expressed as a further listing of HTML text or as additional subdomains of HTML. A circuit 3A40 that embodies a fixed sequence number 03 and that further embodies a fixed object, HTML.00.Fault, embodying a fixed text value, 'Fault;' by way of illustration, a JavaScript command or subroutine that is not supported by a WBM such as a numbered function that may hide a geolocation.js function not authorized by a given user for a given WBM may not match authorized HTML, triggering HTML0.3.Fault, a fault condition that may result in 1A80, ignoring faulty inputs or in other actions such as have been described elsewhere (e.g. CBR and other types of machine learning). Circuits of an example domain may include a circuit 3A50 that embodies a fixed object, HTML.1, which is an object that terminates a domain HTML.

Circuits of an example HTML domain 3A00 may include a successor circuit 3A60, s(0), more specifically s(HTML.0) that may indicate a successor object, HTML.01.<tag> of a starting object HTML.0. An example successor circuit 3A71, s(01), more specifically s(HTML.01.<tag>) may indicate a successor object, HTML.02.js of a starting object HTML.01.<tag>. An example successor circuit 3A72, s(02), more specifically s(HTML.02.js) may indicate a successor object, HTML.00.Fault, of a starting object HTML.02.js— circuits of a Fault object may connect domain circuits to fault management circuits or may handle faults (e.g. by ignoring an input that would attempt to use a successor of HTML.js). An example successor circuit 3A99, s(03), more specifically s(HTML.00.Fault) may indicate a successor object 3A50, HTML.1, a domain terminating object, of a starting object HTML.00.Fault. An example type of successor circuit 3A91, end(01) may associate an object HTML.01.<tag> with a terminal object 3A50, HTML.1, more specifically s(HTML.01.<tag>) that may indicate a domain ending successor object 3A50, HTML.1, of a starting object HTML.01.<tag>. Other relationships in addition to those thus far illustrated may be included in order to perform logic related to a domain.

Figure 3B:
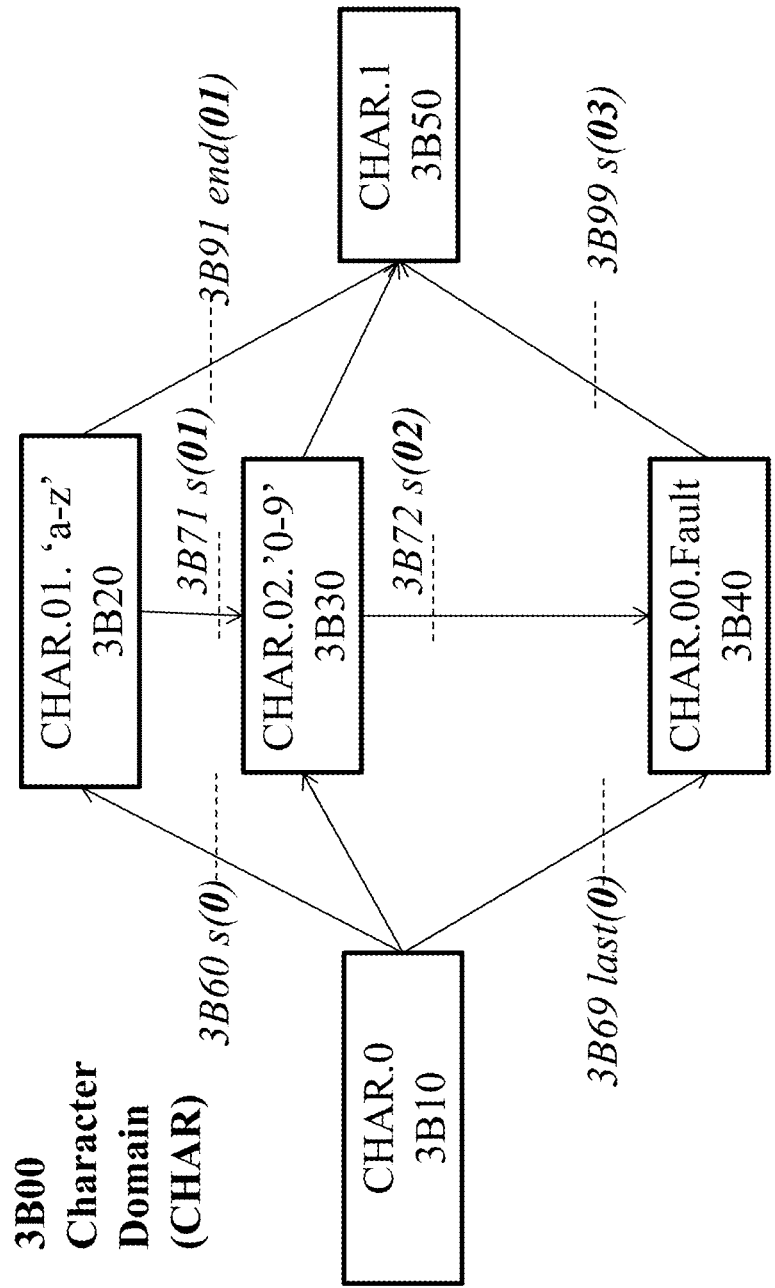
FIG. 3B illustrates an example of a domain for a WBM that provides examples of fixed objects for a domain of characters valid for display, CHAR.

FIG. 3B an Example WBM Domain: HTML

As explained above, a symbol for a place of a WBM may include a domain, such as a symbol for a place [CHAR]. The symbol for the place [CHAR] may contain symbols for the things contained in such a domain, such as the characters a through z, in regular expression (RegEx) notation, 'a-z'. Circuits of a domain [CHAR] may be interchangeably referred to as circuitry for a character (CHAR) domain 3B00. The circuitry for the CHAR domain 3B00, for example, may list characters acceptable for display processing by a WBM. Thus, any characters that could be used to encode malware may be excluded from the list. The circuitry for the CHAR domain 3B00 may include a circuit 3B10 that embodies a fixed symbol 'CHAR.0' which indicates the circuitry is for the CHAR domain. The circuitry for the CHAR domain, for example, may include a circuit 3B20 that embodies a fixed sequence number 01 and that further embodies a fixed object, CHAR.01.'a-z' embodying a fixed text value, "a-z". Circuitry 3B20 may incorporate a list of specific symbols for specific characters such as ['a-z' a, b, c, d, . . . ] where a circuit connected to circuit 3B20 may match any single character 'a' through 'z' within the list ['a-z']. An ASCII character NULL (hexadecimal 00) may not occur in a [list] of specific symbols ['a-z'], as it can be used to encode malware. A list ['a-z'] may comprise circuits expressing the bit patterns of characters (e.g. 'a-z' corresponds to hexadecimal bit pattern values between 71 and 7A) and the circuits may comprise one or more NAND gates. Thus, circuits 3B20 may comprise an arrangement of logic expressed conveniently as CHAR.01. 'a-z', and equivalently a list ['a-z' a, b, . . . z].

Circuits of an example CHAR domain 3B00 may include a circuit 3B30 that embodies a fixed sequence number 02 and a fixed object. Thus, the circuitry may encode CHAR.02.'0-9' specifying the circuitry is of the CHAR domain, corresponds to the sequence number 02, and have the fixed text value, "0-9". Circuitry for "0-9" may further express numbers that are listed in a place ['0-9'] of a circuit 3B30. Circuits of a CHAR domain map 1A20 may recognize a CHAR input CHAR.01, CHAR.02 etc. of a CHAR domain in a symbol 1A10 in a way that may cause a WBM to generate a token for each applicable character that may be input to the WBM via the input port 1A01 of FIG. 1A. Thus, if the input port 1A01 is in communication with a keyboard, the WBM may use the CHAR domain to generate symbols as a user types onto the keyboard. A realization of CHAR '0-9' may achieve the '0-9' function in hardware without interpreting any software code. In fact, a WBM may be physically incapable of interpreting software code, having no CPU, no registers, no operating system, no compilers, and no software interpreter, but it may recognize CHAR '0-9' via hardware and may do so accordingly. A '0-9' domain may be realized as a subdomain CHAR.'0-9' of a CHAR domain.

The above discussion relates to a subdomain of the CHAR domain for the numerical characters 0-9. The CHAR domain may include other acceptable characters and/or subdomains (e.g., capital letters 'A-Z', punctuation, or sequences of characters, numbers and punctuations). The WBM may include circuitry similar the illustrated example of FIG. 3B for each of the subdomains or other sets of acceptable characters. The CHAR domain may include additional circuitry other than the acceptable characters and/or subdomains. For example, the CHAR domain may include circuitry for faults. A circuit 3B40 may embody a fixed sequence number 03 and a fixed object having a fixed text value, 'Fault' (e.g., CHAR.00.Fault). By way of illustration, an HTML string that is to be output by the WBM for display may include a character that is not supported by a WBM (e.g., via a numbered function that encodes geolocation malware). The unauthorized character, upon being tested against the CHAR domain may trigger CHAR.00.Fault by virtue of the character not being included in the CHAR domain. Upon triggering the fault, aa fault condition that me generated (e.g., and transmitted to fault recovery circuitry via 1A80 of FIG. 1A). In some arrangements, WBM may stop processing the text string based on the unauthorized character or perform other actions for fault recovery that are described at other portions of this disclosure (e.g. CBR and other types of machine learning). Circuits for the CHAR domain may include a circuit 3B50 that embodies a fixed object, CHAR.1, which is an object that terminates a domain CHAR.

Circuits of the CHAR domain 3B00 may include a successor circuit 3B60, s(0), more specifically s(CHAR.0) that may indicate a successor object (e.g., CHAR.01.'a-z' is the successor object from the starting object CHAR.0). An example successor circuit 3B71, s(01), more specifically s(CHAR.01.'a-z'), may indicate a successor object, CHAR.02.'0-9' of a starting object CHAR.01.'a-z'. An example successor circuit 3B72, s(02), more specifically s(CHAR.02.'0-9') may indicate a successor object, Char.00.Fault, of a starting object CHAR.02.'0-9'. Circuits of a Fault object may connect domain circuits to fault management circuits or may handle faults (e.g. by ignoring an input that would attempt to use a successor of CHAR.'0-9'). An example successor circuit 3B99, s(03), more specifically s(Char.00.Fault), may indicate a successor object 3B50, CHAR.1, that is a domain terminating object. As illustrated in FIG. 3B, successor circuit 3B91, end(01), may associate an object CHAR.01.'a-z' with a terminal object 3B50, CHAR.1, more specifically s(CHAR.01.'a-z'). Other relationships in addition to those thus far illustrated may be included in order to perform logic related to a domain.

FIG. 4A, an Example Domain Validation Arrow

As explained above, a WBM may include a domain validation arrow 1A20 that may compare a symbol 1A10 to a domain C, for example, a domain of characters valid for display of HTML and authorized for WBM processing, briefly, CHAR. FIG. 4A illustrates an example block diagram for the logic of circuits of an example domain validation arrow 1A20 of a domain of FIG. 3B. A symbol comprising text 'A' may enter an arrow 1A20 via circuits 4A01 for temporary storage in a memory block 4A10 of FIG. 4A.

Memory block 4A10 may be isolated from other memory blocks of a WBM. In an example, a symbol may not flow from a memory block 4A10 directly to any other memory block (e.g., to a memory block 4A50, memory block 1A30 of FIG. 1A or to any other memory block). Instead, a symbol may flow from a memory block 4A10 via one or more pipe segments having the logic of FIG. 4A, such as via a domain validation pipe segment 1A20 having logic illustrated in FIG. 4A. A symbol may flow from a memory block 4A10 corresponding to a memory block 1A10 of FIG. 1A to a memory block 1A30 of FIG. 1A via a pipe segment 1A20 that may comprise the logic of FIG. 4A. In some arrangements, there may be only one way for symbols to flow from memory block 4A10 to memory block 1A30 such as through pipe segment 1A20 comprising the logic of FIG. 4A. In some arrangements, there may be multiple ways for symbols to flow from memory block 4A10 to memory block 1A30 such as through an arrangement of pipes and arrows related to a subdomain (e.g. of HTML <tags> or of JavaScript, JSON, etc.) of an HTML domain of FIG. 3A. In some arrangements, there may be multiple ways for symbols to flow from memory block 4A10 to memory block 1A30 such as by an arrangement of pipes and arrows comprising the logic illustrated in FIG. 4A, according to subdomains of a CHAR domain of FIG. 3B.

In a WBM, a pipe segment may perform a domain membership test, as shown by pipe segment 1A20 of FIG. 1A, realized in some embodiments via the logic of FIG. 4A. To ensure that symbol 4A10 is in fact a member of a Domain CHAR, various checks may be performed. For example, symbol 4A10 may be compared to circuits of a CHAR Domain 4A30 to determine that the value of symbols 4A10, e.g. 'A' may be associated with a pattern 'A-Z' of an CHAR specification found within a Domain CHAR of circuits 4A30, as further illustrated in FIG. 3B. Pipe segment 1A20 may be realized as a fixed, unidirectional structure of combinatorial logic, e.g. according to FIG. 4A.

By way of illustration in FIG. 4A, circuits of a network 4A20 may obtain a symbol 'A' to deposit a symbol in a memory block 4A10. Logic circuits 4A40 may compare the value of a symbol stored in memory block 4A10 presented via circuits 4A03 with members of a CHAR domain, e.g. of FIG. 3B that may comprise circuits 4A30 of FIG. 4A. Finding a symbol 'A' in circuits 4A30, circuits 4A40 may form a symbol (CHAR, 'A, size, font, HTML') that may be stored in an example memory block 4A50. A memory block 4A50 may realize symbol 1A30 of FIG. 1. A symbol (CHAR, 'A, size, font, HTML') comprising notation for an object may be termed a token that may flow through a WBM from one memory block 4A50 realizing symbol 1A30 to another pipe such as pipe 1A40 of FIG. 1A.

Suppose circuits 4A40 do not find the contents of memory block 4A10 in circuits 4A30; then circuits 4A40 may generate a (Fault) symbol 4A41, and circuits 4A05 may generate a domain fault signal 4A41, an error in which an input symbol is not found in a domain.

A WBM may be configured to expect that symbol of memory block 4A10 is a member of a Domain CHAR. A domain such as that illustrated in circuits 4A40 may be very specific depending on the web viewing services being implemented by a WBM. The determination performed by pipe segment 1A20 according to logic of FIG. 4A may produce a new symbol 4A50 indicative of the domain that was checked and the original input symbol, and the context of the original input symbol, such as a member of an HTML string, mapping a valid input 4A10 to a valid CHAR domain symbol 4A50.

In another example, a symbol 4A10 may be produced via TCP IP circuits 4A20 that may, for example, contain text "NULL, HACKPROOF". The text "NULL" could fail to satisfy the domain membership test performed by pipe segment 1A20 according to logic 4A00 (e.g. if "NULL" is not found in the domain CHAR that may include 'H', 'A' and the other characters of "HACKPROOF" but not 'NULL'). Accordingly, a pipe segment 1A20, according to logic 4A00 may ignore input of a memory block 4A10 containing text "NULL" (e.g. by clearing variable memory block 4A10 via a hardware reset line that may reset block 4A10 after receipt of an input). In some examples, a pipe segment 1A20, according to logic 4A00 may generate a (Fault) 4A41 that may cause circuits 1A80 to interact with a user, to learn according to a (Self) description, or to perform other such fault-management logic as may be realized in circuits 1A80.

A pipe 1A20 testing a symbol 1A10 according to the logic 4A00 comprises one example of a domain test. Other symbols obtained from a network 1B10 or from a keyboard 1B31 according to circuits 4A00 may cause other symbols 4A50 configured by circuits 4A06 according to the symbol notation of FIGS. 2A and 2B according to the needs of other types of web page display functions.

Figure 4B:
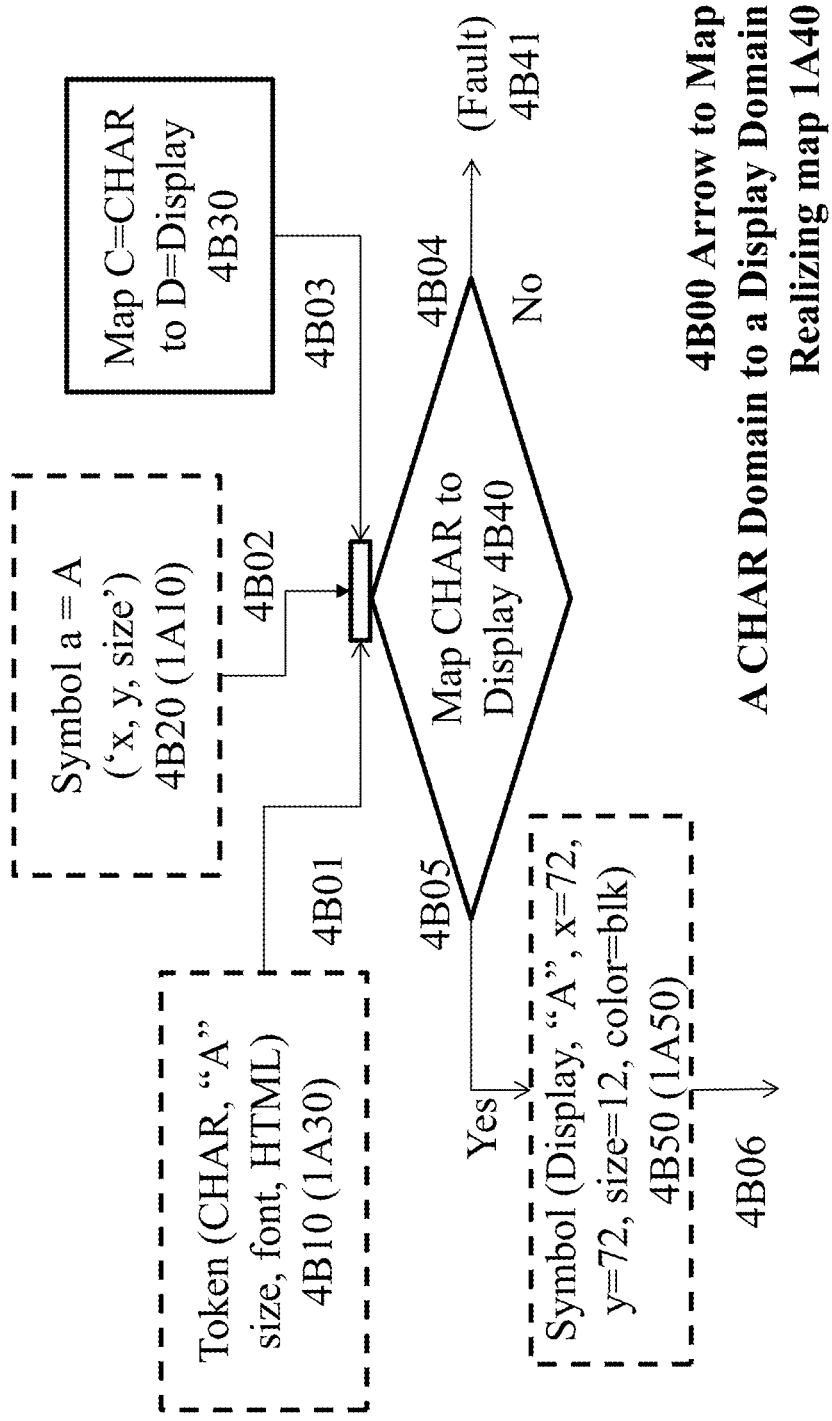
FIG. 4B illustrates an example block diagram for a validation arrow for a WBM that matches an HTML domain to a display domain.

FIG. 4B, Mapping a CHAR Domain to a Display Domain

FIG. 4B illustrates an example block diagram for a map arrow, which maps a CHAR Domain to a Display Domain. For example as illustrated in FIG. 4B, a symbol may be obtained by circuits 4B01 and represented in memory block 4B10. In one embodiment, memory block 4B10 may realize the memory of symbol 1A30 of FIG. 1A. In such embodiments, the logic of circuits of FIG. 4B may realize the function of map 1A40 of FIG. 1A. Map 1A40 may be realized by the logic of pipe segments that may perform a mapping from one domain to a different domain, for example according to the logic of circuits illustrated in FIG. 4B. According to the logic test 4B40 of FIG. 4B, a pipe segment may map one or more inputs (4B10, 4B20) that may occur in one or more domains (e.g. a CHAR Domain, an HTML Domain, etc.) to determine an output that may occur in another domain. Map 4B00, for example, provides logic by which elements of a one domain are associated with elements of another domain. In this example 4B00, a CHAR Domain symbol token 4B10 may correspond to symbols at 1A30 of FIG. 1; further in this example 4B00, a CHAR Domain symbol 4B20 may correspond to input symbols "a" at 1A10 of FIG. 1. According to circuits 4B40, a symbol 4B10 may express the logic of a character within a pattern of characters, such as the character "A" in an HTML pattern "HACKPROOF" that logic circuits 4B40 may match to various input symbols of an input memory 4B20 (corresponding to 1A10 of FIG. 1). A match may be achieved by an arrangement of parallel pipe circuits of logic 4B40 having a degree of parallelism corresponding to the size of a memory block 1A10. A match may establish that memory block 4B20 contains a valid member, "A" of a CHAR domain according to a correspondence between memory blocks 4B10 and 4B20 in which the character, A, of 4B10 matches the character A of 4B20. Circuits 4B40 may assure that logic criteria are met (e.g., that the HTML contents of memory block 1A10 is preserved during the logic of 4B40, e.g. as to the location of character A within an HTML paragraph, title, or other indicator). As shown in logic 4B30, a CHAR item thus recognized in 4B40 must occur in a map (C,D), which is a map(CHAR, Display) in 4B30, in order to be mapped to a Display Domain. In the example of FIG. 2B, the CHAR Domain contains 'A-Z' as a type of data to be displayed. Informally, this means that there is a place in a display memory where characters of a web page may be placed for display. The pattern match 4B40 establishes that the A character matched to memory block 4B20 delimit a symbol "A" within a larger string of characters such as "HACKPROOF". In some embodiments, the success of this map may establish that, in a CHAR domain, A has a size and location derived logically from symbol a. Consequently, a symbol (Display, title=HACKPROOF) of a Display Domain, D, may be constructed by logic 4B40 at memory block 4B50 (that corresponds to memory block 1A50 of FIG. 1). There are many alternative ways of representing an association between an input symbol 4B10 and a second, related, input symbol 4B20 that yields a symbol 4B50. Thus, logic circuits 4B40 may match any validated CHAR Domain symbol 4B10 with an arbitrary input symbol 4B20, and look up the resulting type of match according to the lookup table 4B30. Mapping determines an output for the pipe realized by logic circuits 4B00 of an arrow 1A40 of FIG. 1A. In some realizations, circuits 4B00 may generate a symbol (Display, A, x=72, y=72, size=12, color=blk) in a memory block 4B50 corresponding to memory block 1A50 of FIG. 1A, for example, placing the letter "A" near the top left corner of a bitmapped display.

In another case, circuits 4B00 may generate a (Fault) signal 4B41 that may stimulate other circuits to respond to a failure for an input to be associated with an output of a pipe 1A40 realized by circuits 4B00. A pipe 1A20 testing a symbol 1A10 according to the logic 4A00 comprises one example of a domain to determine the usage of symbols 4A10, e.g. to find a character A within a sequence of characters "H", "A", "CKPROOF" that may be assigned to an associated font, size, etc. as may be found within a Domain CHAR. Thus, an encapsulation symbol '<title>HACKPROOF </title>' at 1A10 may result in the generation of a symbol (Display, A, x=72, y=72, size=12, color=blk) for circuits 1A60 that map the symbol "A" into the title location of a display hardware 1A02.

The contents of a memory block 4B50 returning a response may be set only by circuits 4B05 of pipe logic 4B00, which may complete the logic function of mapping symbols 4B10 and 4B20 of one domain of a variable memory block 4B10 to a resulting variable memory block 4B50. A Map (CHAR, Display) of logic 4B30 is shown to map a CHAR Domain onto a Display Domain, which, for example, can be processed to determine the data for displaying various web pages, data entry forms, and other information useful for a web browser display function. A map 1A40 may comprise a complete map termed an arrow if the logic 4B00 covers all of the possibilities between the input and output domains and thus achieves a degree of completeness of mathematical structure in mapping Domain CHAR onto Domain Display via, e.g. logic 4B30. A mapping performed by a pipe segment 1A40 may satisfy the definition of a finite limit sketch category, as is known in the branches of higher mathematics of computability and of category theory. Thus, a very simple computational device such as a lookup table with associated logic circuits 4B00 may realize in hardware a theory of computability that may reduce or eliminate malware from entering into a WBM or from using a WBM in a manner in which it was not intended.

Pipe segments may be simple circuitry, such as the logic of 4B30; or may be more complex circuitry, such as a circuit to compare a variable content of a memory block to circuits describing a domain of legal requests embodied in the logic circuits via text or other data representing symbols according to notation 2A00 for example.

FIG. 4C, Mapping a Display Domain to a Hardware Domain

FIG. 4C illustrates an example block diagram for a map arrow, which maps a Display Domain of symbols 1A50 of FIG. 1 to a Hardware Domain of symbols 1A70 of FIG. 1. For example, as illustrated in FIG. 4C, a symbol may be obtained by circuits 4C01 and represented in memory block 4C10. In one embodiment, memory block 4C10 may realize the memory and associated logic of symbol 1A50 of FIG. 1A. In such embodiments, the logic of circuits of FIG. 4C may realize the function of map 1A60 of FIG. 1A. Map 1A60 may be realized by the logic of a pipe segment that may perform a mapping from one domain to a different domain according to the logic of circuits illustrated in FIG. 4C. According to the logic test 4C30 of FIG. 4C, a pipe segment may map an input that may occur in one domain to determine an output that may occur in another domain. Map 4C20, for example, provides a calculation by which elements of a one domain are associated with elements of another domain. In this example 4C20, a display request symbol (Display, "A", x=72, y=72, size=12, color=blk) may place a symbol "A" into a part of a display located 72 pixels from the upper left corner of the display hardware and 72 pixels from the top. For this request to be realized in a WBM, the map (Display, Hardware) of computation 4C20 may compute x+size=72+12=84; comparing pixel array size 4C20 to x+size at 4C30 determines if x+size is less than the size of the display; if so, then the Display request symbol at 4C10 is compatible with the number of pixels in the hardware, by way of illustration; other information, not shown, may be included in a computation as needed by display hardware to successfully display a character, such as color of the font, color of the background, etc. A pixel computation 4C30 x+size is just one example of the many alternative ways of representing an association between an input symbol 4C10 and a resulting symbol 4C40. Thus logic circuit 4C30 may compute any feature of any input symbol 4C10 in the map 4C20 to determine an output for the pipe realized by logic circuits 4C00. In one case, circuits 4C00 may generate a symbol (Bitmap: x41,72,72,12,FFF) as an output symbol 4C40, the generation of which may be signaled to other circuits via output signaling line 4C06; in another case, circuits 4C00 may generate a (Fault) signal 4C31 that may stimulate other circuits to respond to a failure for an input to be associated with an output in of a pipe 1A40 realized by circuits 4C00.

The contents of a memory block 4C40 returning a response may be set only by circuits 4C04 of pipe logic 4C00, which may complete the logic function of mapping a value of a symbol 4C10 of one domain of a variable memory block 4C10 to a resulting variable memory block 4C40. A Map (Display: Hardware) of lookup table 4C20 is shown to map domain Display, for example including a request to display a character, A, onto a domain Hardware, for example including various display memory coordinates, font colors, etc. A map 1A60, realized in part by logic 4C00 may comprise a complete map termed an arrow if the logic 4C00 covers all of the possibilities between the two domains and thus achieves a degree of completeness of mathematical structure in mapping Domain Display onto Domain Hardware via, e.g. 4C20. A mapping performed by a pipe segment 1A60 may satisfy the definition of a finite limit sketch category, as is known in the branches of higher mathematics of computability and of category theory. Thus a very simple computational device such as a lookup table with associated logic circuits 4C00 may realize in hardware a theory of computability that may reduce or eliminate malware from entering into a WBM or from using a WBM in a manner in which it was not intended.

Pipe segments may be simple circuitry, such as the logic of x+size 4C00; or may be more complex circuitry, such as a circuit to compare a variable content of a memory block to circuits describing a domain of legal requests embodied in the logic circuits via text or other data representing symbols according to notation 2A00 for example.

Symbols being output at a port 1A02 of FIG. 1A (e.g., further illustrated as, for example, comprising circuits of a display 1B31 of FIG. 1B) may be further converted by circuitry in the WBM. For example, the WBM may convert any symbol received at a port 1A10 to human-readable text, images, audio, etc. Users of the WBM or other devices attached to the WBM (e.g., via a display, audio speakers, virtual reality goggles, etc.) then may be provided with the web data browsing experience.

Figure 5A:
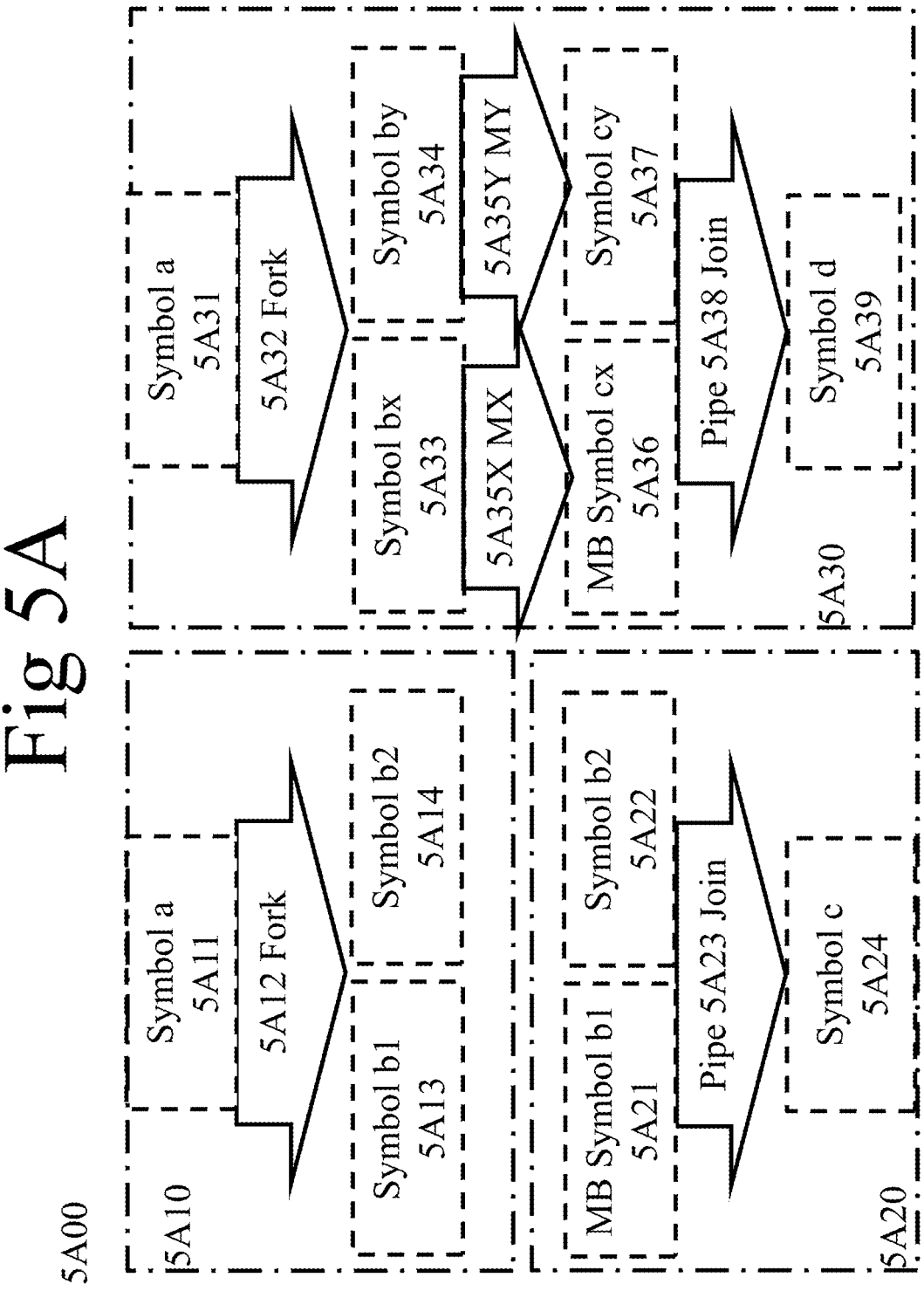
FIG. 5A illustrates examples of parallel pipes that may be formed by objects of memory blocks and arrows of pipes.

FIG. 5A Fork, Join, and Parallel Pipelines

FIG. 5A illustrates examples of parallel pipes that may include pipes that fork, pipes that join, hierarchical pipes and pipes that may be formed by objects of memory blocks; pipes having completeness with respect to domains may comprise arrows of pipes in a DUPPL machine. A WBM may employ such parallel pipelines as further illustrated in FIGS. 5C, and 6. An input symbol, a, 1A10 of FIG. 1, may flow through parallel pipelines to an HTML domain of FIG. 3A according to one parallel pipeline as simultaneously each character of symbol a may flow through an alternate parallel pipeline through a CHAR domain of FIG. 3B with results combined in a Join pipe, at 1A60, for clarity of presentation not shown in FIG. 1.

Figure 5B:
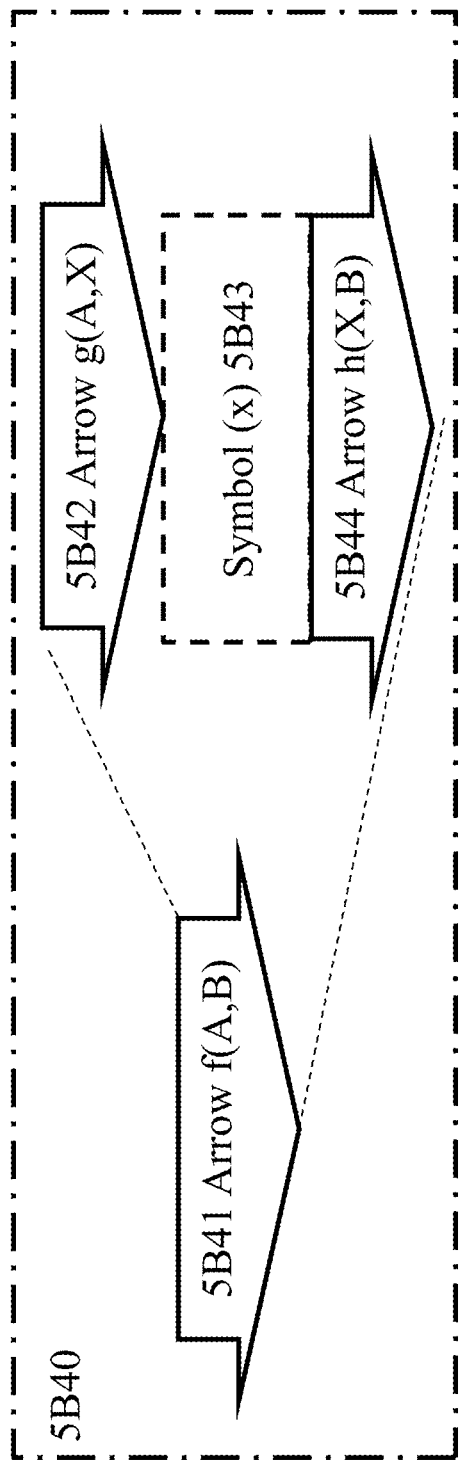
FIG. 5B illustrates an example of a hierarchical pipeline that may be formed by objects of memory blocks and arrows of pipes.

FIG. 5B Hierarchical Arrows

FIG. 5B illustrates examples of hierarchical arrangement of pipes and memory blocks that may be termed a hierarchical arrow of a DUPPL machine. A WBM may employ such hierarchical arrows as illustrated further in FIG. 5C.

Figure 5C:
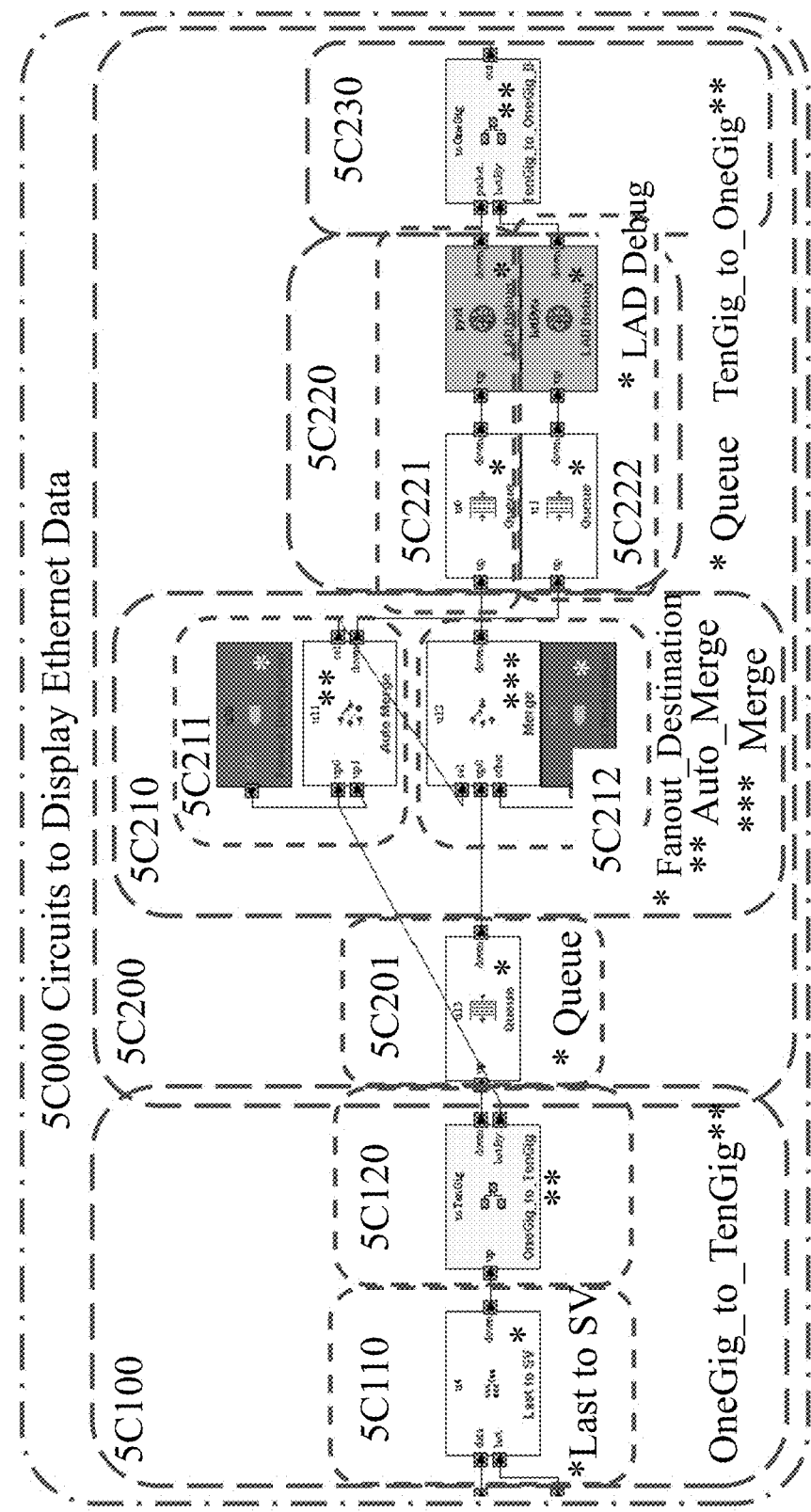
FIG. 5C illustrates an example block diagram for a circuit that implements aspects of a WBM and is configured to display Internet data.

FIG. 5C A WBM Arrow to Display Ethernet Data

FIG. 5C illustrates circuits to display data from the Internet as an arrow Display Ethernet Data 5C000. A circuit, 5C000, may be realized, for example, via circuits employing the method of an application of fork and join circuit arrangements of FIG. 5A combined with the method of a hierarchical arrangement of circuits of FIG. 5B. The apparatus of 5C000 may be realized via a block diagram language for digital circuit design as Matlab® Simulink, Annapolis Microsystems CoreFire (used in FIG. 5C) and many other commercial tools for representing circuits as a block diagrams. In particular, FIG. 5C illustrates circuitry in block form from a graphical circuit design tool (e.g., Annapolis Microsystems' CoreFire), which allows a designer to create a circuit by editing, dragging, dropping and interconnecting blocks for particular circuitry. In some embodiments, the blocks of the graphical circuit design tool may represent portions of VHDL code, which in turn can be used to create an FPGA image.

Contemporary art of such block diagram languages allows the use of instruction sets, random access memory, and arbitrary feedback loops. The apparatus 5C000 avoids instruction sets, random access memory, and arbitrary feedback loops and comprises, instead, a hierarchy of feedforward parallel pipelines having forks, joins, queues, and other discrete logic according to the illustration of FIG. 5C.

A pipe 5C000 may comprise an input pipe to display Ethernet data from an Ethernet circuit 1A01 containing data from the Internet. A pipe 5C000 may comprise some circuits of an arrow 1A20 of FIG. 1A that may obtain a display symbol 1A10 from the Internet.

Figure 6:
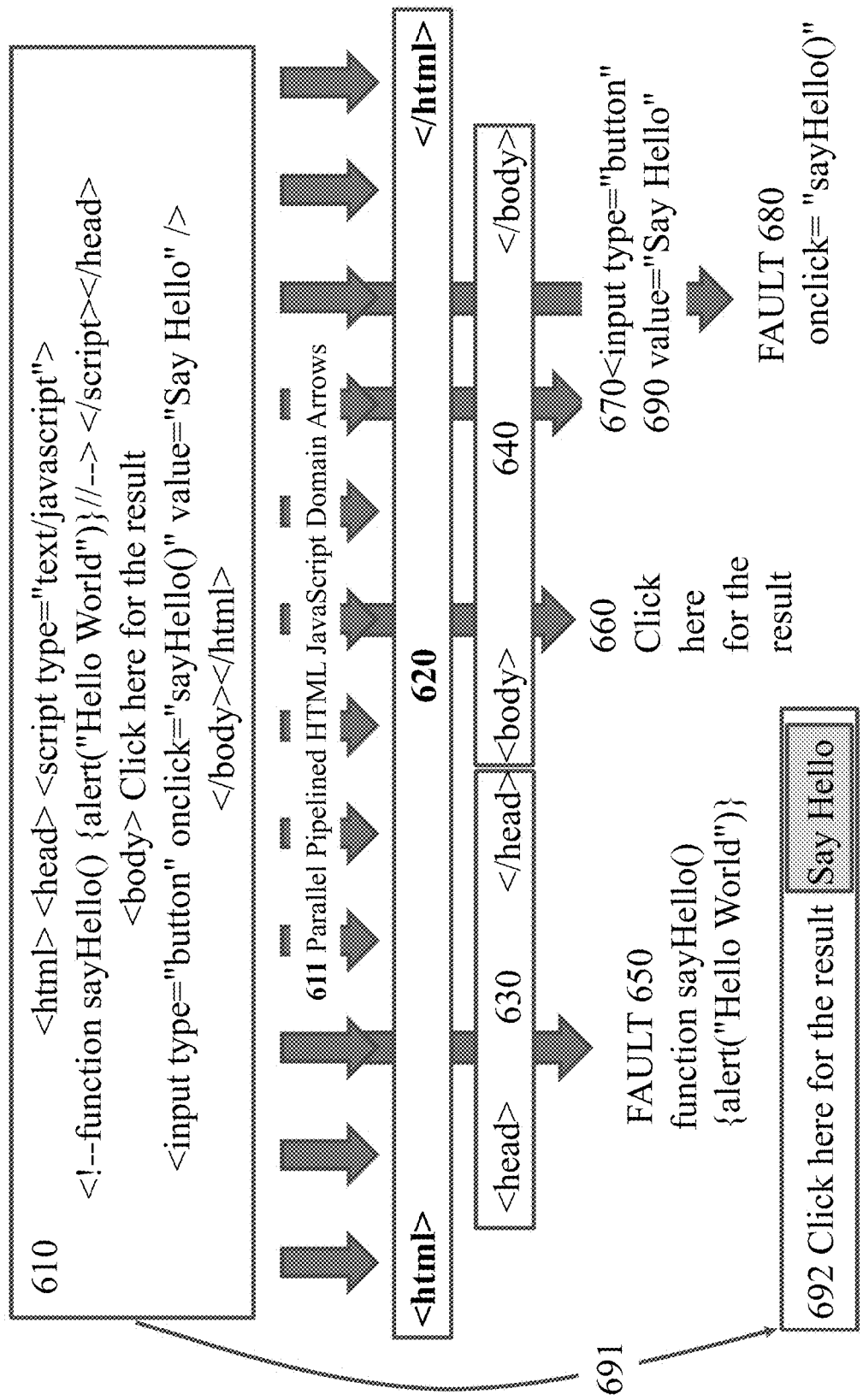
FIG. 6 illustrates examples of token processing.

FIG. 6 Interpreting the HTML and JavaScript Languages

FIG. 6 illustrates examples of maps that may occur in a WBM the logic that may interpret HTML and JavaScript text according to language standards. A symbol 610 may occur at an input 1A10 of FIG. 1A. A WBM may comprise an arrangement of pipelines according to FIGS. 4A, 4B, and 4C having hierarchical parallel pipelines according to 5A, 5B, and 5C expressed for ease of understanding as arrows 611 of FIG. 6. There may be many more arrows 611 than illustrated in FIG. 6 or there may be many fewer arrows according to design of circuits realizing HTML and JavaScript text recognition functions. A pair of arrows 620 may recognize a tag <html> indicating the beginning of text according to HTML and a corresponding tag </html> indicating the end of HTML text. Circuits of an arrangement 611 may embody HTML Domain description according to FIG. 3A in each arrow, enabling each arrow to recognize and map HTML. Thus, the location of the <html> start and end tags at the first and last arrows illustrated is for convenience of disclosure, not limiting the invention in any way. The pair 620 may be said to have delimited the HTML text of the input symbol 1A10. The pair 620 may comprise circuitry defining each arrow between this pair as comprising HTML text, such as by an HTML signal, flip flop, or other method according to the efficiency of circuit design. An arrow 620 may exchange character pointers to input 1A10 with its neighbor arrow so that the scope of the adjacent neighbor's text input does not include the tag <html>. An arrangement of circuits among arrows may, for example, have one arrow for each character of text (20,000 input characters then would entail 20,000 arrows), termed its starting position. An arrangement of circuits across arrows may enable a given arrow to examine text to the left or right of its starting position. Thus an arrow 620 recognizing an HTML tag "<html>" may be the result of six arrows in a parallel pipelined hierarchical arrangement according to FIGS. 5A and 5B.

The pair of arrows 630, in parallel with the operation of the pair 620 may recognize and map tags <head> and </head>, for example, in HTML delimiting the header of a web page. The pair of arrows 640, in parallel with the operation of the pair 620 may recognize and map tags <body> and </body>, for example, in HTML delimiting the body of a web page. Arrows (not shown) further may match <script type="text/javascript">, enabling the arrangement of arrows 611 to test text segments for the JavaScript domain, js, which may be a subdomain of HTML in some embodiments.

An arrow 650 may generate FAULT 650; and it may detect a JavaScript text form "function sayHello( )". A WBM may allow the use of certain JavaScript functions, but not others. In some variations, the name "sayHello" between the text "function" and the argument "( )" is not a function that this particular WBM allows. If one attempts to run this HTML/JavaScript code in a browser, a browser may not allow this script. Thus, a region of a Display Domain at the top of the display that may in some situations display a title, according to HTML 610, may remain blank according to a FAULT. An HTML/JavaScript fault may generate a FAULT token, in some embodiments expressing a FAULT in a place convenient for an interested user to view. Thus, a (Fault) token 650 may comprise (Fault [650 "function sayHello( ){alert("Hello World")}" is not an allowed JavaScript function according to the Self description]). Accordingly, a FAULTS region of a Display Domain, for example, logically at the bottom of the display may display a fault.

An arrow 660 may aggregate the text between the tag <body> and the tag <input . . . >. Such text, being contained within the scope of <body> delimiters may result in a mapping from an HTML domain to a display domain, for example having a value (Display body="Click here for the result"). Such text further may be mapped to a portion of a hardware display containing the text of a body of an HTML page. Similarly, an arrow 670 may recognize a legal JavaScript declaration of a button, "<input type="button". An arrow may incorporate circuits between arrows defining the scope of the <input expression as the subsequent "/>". Consequently arrow 690, falling within the scope of said button may generate a token (Display Button 670 value="Say Hello"). At the same time, an arrow 680 may recognize the text "sayHello( )" as a call to a JavaScript function that is not a member of the JavaScript domain, generating a fault 680 and consequently generating a fault log token similar to Fault 650.

The net effect of various parallel pipe circuits operating on HTML 610 containing embedded JavaScript 650, 670, 680, and 690, some of which is contained within a JavaScript Domain of a WBM and some of which is not and thus generates faults 650 and 680 may be a mapping 691 of input 610 to a hardware display 692 according to the HTML and JavaScript Domains embodied into the WBM (Self) and realized by the various pipes and arrows performing these maps.

An arrangement of JavaScript text termed an object entails an object name, with names of slots and values in dot-notation, such as object.slot. A WBM may accommodate any number of objects having values defined in HTML, by a web server, etc. using an arrangement of arrows 611. An arrangement of JavaScript text comprising an unrecognized function, such as sayHello( ) of 610 may generate faults 650 and 680. A WBM that does not allow the use of unrecognized functions may provide a web browsing facility for which there is no possibility of what is termed in the art a "Man in the Browser" or MitB attack. Thus, a WBM specifically configured for on-line banking with a specific bank, for a factory floor of a given manufacturing enterprise, for an electric power grid of a given electrical services provider, etc., may not suffer MitB attacks (e.g. of the Stuxnet type).

The illustrative input 610 is provided for clarity of disclosure and should not be taken as limiting a WBM from containing other pipes and arrows that may perform the logic of arrays, loops, listeners, and other constructs of the JavaScript scripting language, nor the obvious equivalent hardware logic accommodating such constructs in other scripting languages as Python, Perl, TCL, Ruby, TensorFlow, etc.

Figure 7:
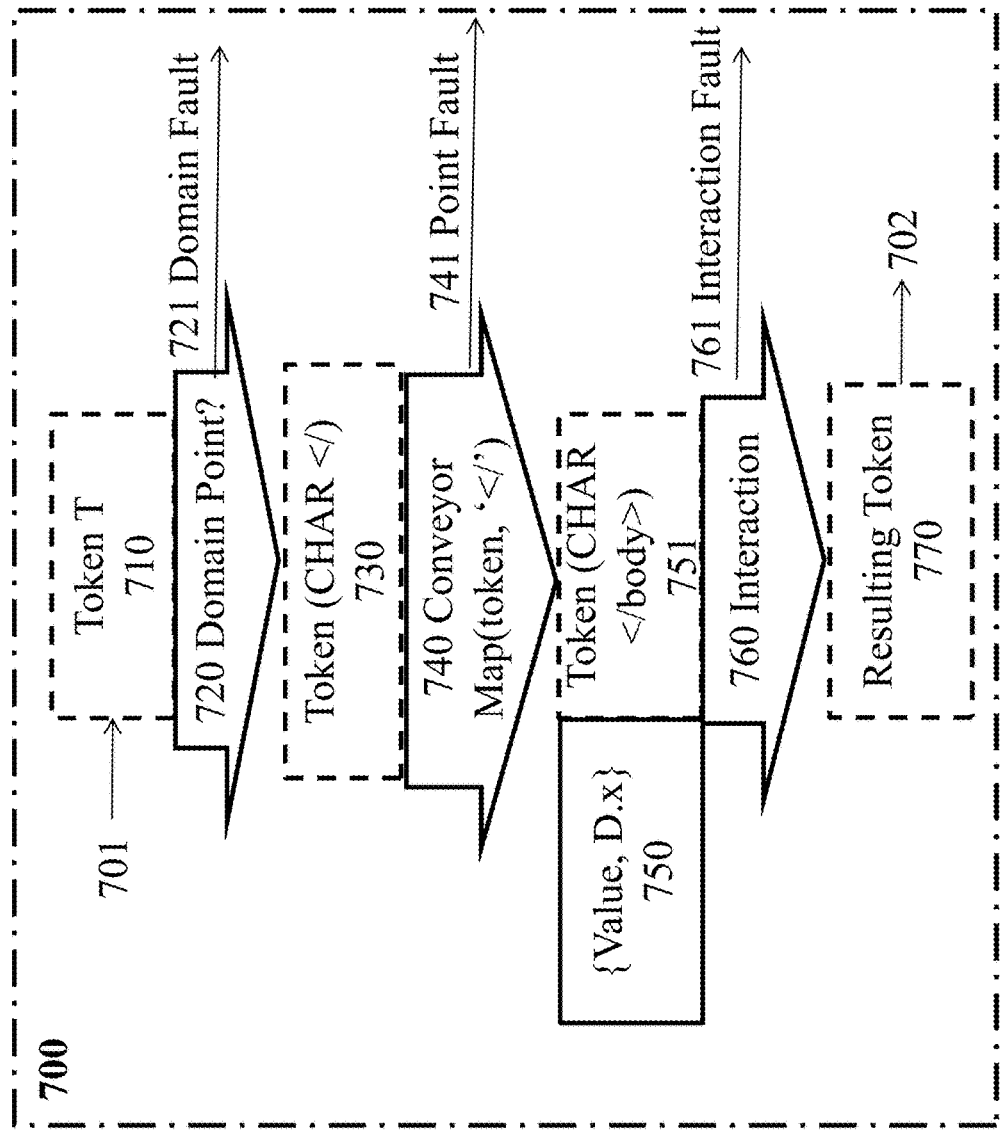
FIG. 7 illustrates an example conveyor belt for processing tokens through a sequential arrangement of arrows.

FIG. 7 HTMP Parsing Conveyor Belt

FIG. 7 illustrates an example conveyor belt for processing tokens through an arrangement of arrows providing rapid access to a large collection of symbols and tokens. A WBM may include a symbol '<body>' of an HTML web page that may have a direct one-to-one mapping of a companion symbol </body> realizing the conveyor belt apparatus of FIG. 7 via a signal line 740 from a display request 730 to a Web Page 750 such that a <body> symbol may cause the delivery of the contents of a web page between <body> and </body> or upon not locating the search string "</", may generate a fault. Thus, a simple signal line may achieve the function of the DUPPL Conveyor Belt arrangement of circuits of FIG. 7. Other arrangements of signal lines and data may optimize a conveyor belt for parallelism, for speed of parsing an HTML, JavaScript, JASON, Ruby, Perl, Python, TensorFlow, or other scripting language; or to minimize the number of circuits of a conveyor belt, or for some other purpose. In another example, a function autocomplete.js is a JavaScript function that accesses dictionaries to determine the most likely word that a user is typing such that the user can hit tab or enter or click on the word desired instead of typing the word; a conveyor belt may link a text character from a keyboard 1B31 to a Dictionary Domain that may enumerate words of a given language, matching characters entered so far with elements of a Dictionary Domain; the matched results may be sent directly via conveyor belt to an area of display hardware memory reserved for showing autocomplete candidates, completely bypassing the rest of the logic of a WBM. As each new keystroke of a word is added to the word in progress, the number of candidates becomes fewer; if there are no candidates, then the word may be disallowed (e.g. suppressing profanity) or may be learned via fault management as a new dictionary word.

Other uses of other types of conveyor belts of a WBM include saving work in case of lack of network access, resuming work when network access resumes, repeating security protocols on behalf of a known authorized user, etc.

Figure 8A:
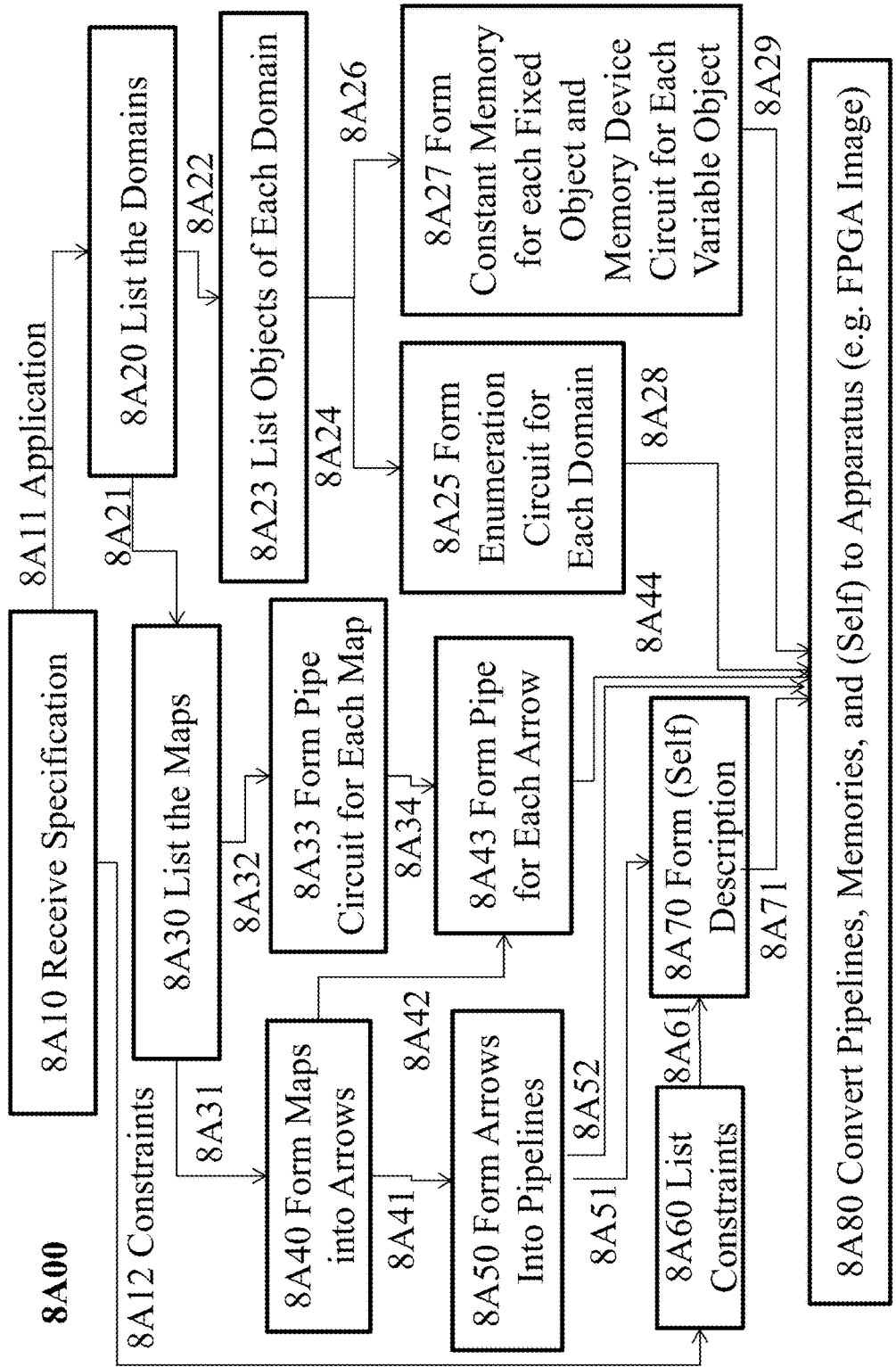
FIG. 8A illustrates an example flow chart that depicts a method for transforming a specification into a representation of a DUPPL machine that can be implemented by a reconfigurable apparatus, such as an FPGA.

FIG. 8A Method for Transforming a Specification into a Machine

FIG. 8A illustrates an example flow chart that depicts a method for transforming a specification into a DUPPL machine. A specification of a WBM may comprise text 2B100 providing a human readable specification in natural English language. Via symbol notation 2A00, a WBM specification 2B100 may be expressed more compactly in a symbolic form 2B200. A method for transforming specifications 2B100 and 2B200 into a WBM comprising circuits according to FIGS. 3A through 7 is represented in FIG. 8A.

Designers applying the method of FIG. 8A may receive a specification according to a process 8A10. The specification may comprise a statement as illustrated in 2B100 of FIG. 2B. The specification may comprise an existing implementation such as software of a web browser display that performs display and interaction functions intended for a WBM. Designers may identify an application 8A11 expressed in a specification. For example, the application may be for on-line banking or controlling automated manufacturing devices on a factory floor. In the case of specification 2B100, 8A11 may comprise a single application defining a WBM for recognizing HTML and displaying a corresponding web page. The method of FIG. 8A may be used to construct a DUPPL machine having many different WBM's having a diversity of applications of which 2B100 serves as an illustration. The illustrative specification of 2B100 is simplified for clarity of disclosure.

For a WBM application 8A11, there may be Domains 8A20 defining for example collections of data elements of a WBM. A WBM, for example, may include domains TCP IP, HTML, JavaScript, JSON, Python, Perl, TCL/TK, and Ruby expressed at a high level, for example, in English in 2B100 and expressed in high level symbol notation in 2B200. A domain indicated at a high level such as HTML, may entail sub-domains at a next lower level, as scripting languages. An HTML tag <script . . . > for example may specify a scripting language that may comprise distinct sub-domain of 8A20. A process 8A22 may cause the objects of each domain and sub-domain to be identified, forming the contents of an object list 8A23 for each domain 8A20. A WBM, for example, may include a Domain HTML, the objects of which may include "<title>" and "display" according to notation 2A00 expressed as a hierarchical Domain thing (HTML) of 2B200 containing tag data elements (<title>title</title>), script data elements (<script type="text/javascript">), etc. noted in 2B200 as (tags (<title>title</title>) (<b>bold-faced-font </b>) . . . )) and (display (memory)).

The application of a process 8A00 noted in FIG. 8A may result in the generation of data objects, pipes, arrows, and memory blocks, circuits, forming an apparatus 8A80 of FIG. 8A.

Figure 8B:
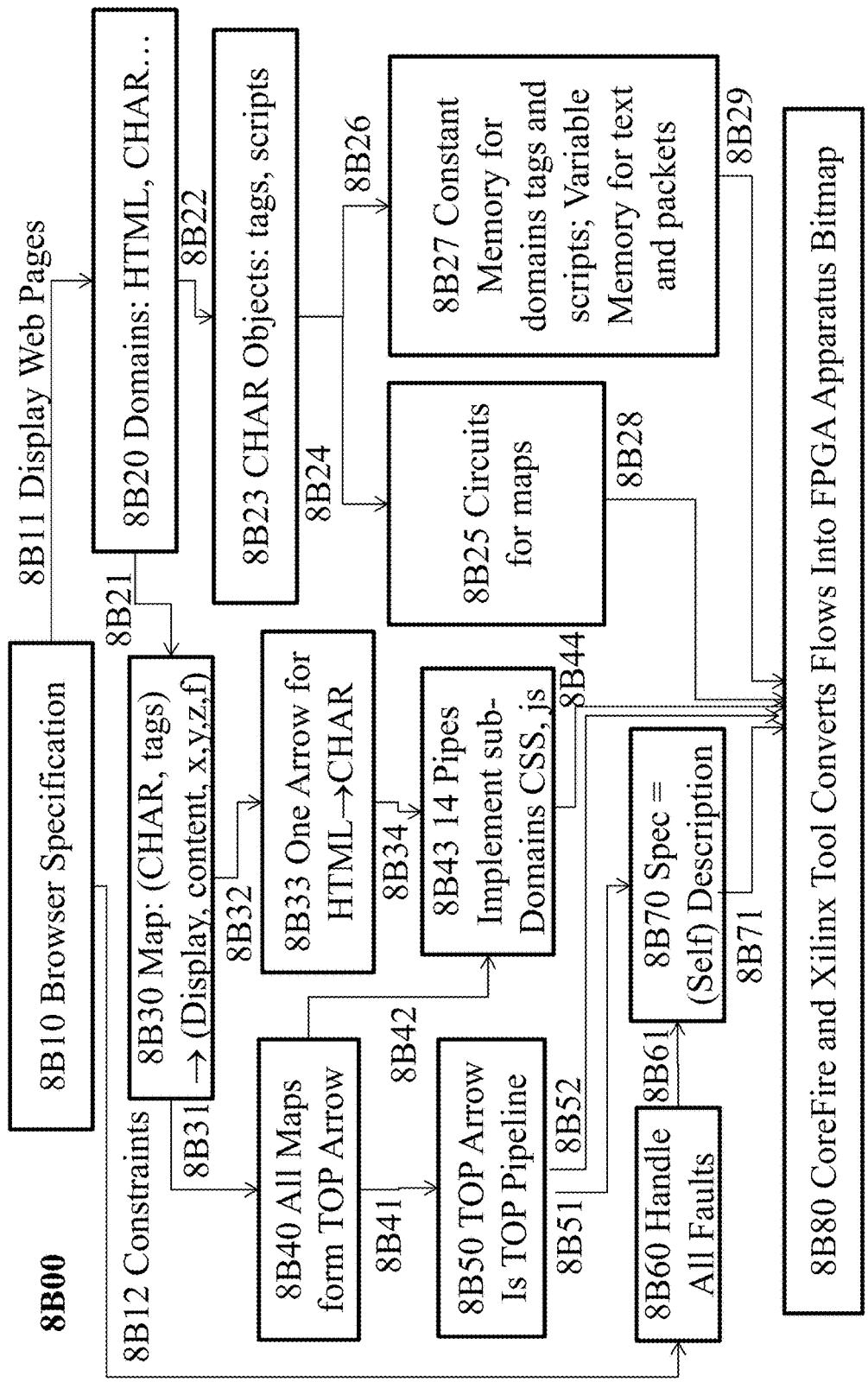
FIG. 8B illustrates an example flow chart that depicts a method for transforming a web browser specification into a representation of a WBM that can be implemented by a reconfigurable apparatus, such as an FPGA.

FIG. 8B Method for Transforming a Browser Specification into a WBM

FIG. 8B illustrates an example flow chart that depicts a method for transforming a specification for an example WBM into a web browser display machine apparatus according to a DUPPL machine method 8A00. According to the discussion of FIG. 8A, there may be a WBM specification 8B10, a WBM application 8B11 to browse web pages, Domains 8B20 that may include HTML, scripting sub-domains, Cascading Style Sheets (CSS), and one or more hardware Display Domains. From an enumeration process 8B22 there may be a list of HTML objects 8B23 that may include tags such as <title>, sub-Domains such as JavaScript (js), and display. Pairs of objects of various domains of a WBM may be analyzed to identify maps 8B30. In the example WBM, such maps may include a Map: (HTML, tags)→(Display, content, x,y,z,f) expressing logic for mapping tagged HTML content into an x, y, z location (e.g. in pixels) of a display memory, displayed according to a parameter f such as font-type, color, etc. Process 8B00 for an example WBM may include the analysis of maps 8B30 to identify a complete, consistent composite top-level collection of maps, TOP, 8B40, termed an arrow as are certain collections of maps. The TOP arrow 8B40 may be expressed in a symbol form in a symbol form of a WBM specification 2B200 of FIG. 2B. According to a further analysis 8B41 of a TOP arrow 8B40, a TOP pipeline comprising a hierarchy of arrows may be formed as a TOP Pipeline 8B50. A TOP Pipeline may comprise circuits to display data from an Ethernet Port 80, such as example circuitry of FIG. 5C forming an initial pipe of a pipeline. A design process 8B52 may transform a TOP Pipeline 8B50 into blocks of a block diagram language 8B80 that may be converted, for example, into a bitmap personality of a Field Programmable Gate Array (FPGA) to form an example WBM via a bitmap of a Xilinx FPGA, for example.

A further analysis 8B32 of a map 8B30 may determine whether it may be helpful to arrange many pipes in parallel (as disclosed in 611 of FIG. 6) and to form one or more conveyor belts for rapid access to data of a DUPPL machine. A resulting expression 8B33 may associate the identification of a display request in an HTML Domain with the generation of a Web Page in a Display Domain employing parallel pipes (e.g. 611) and a conveyor belt. A further design process 8B34 may convert an expression 8B33 into a hierarchy 8B43 of domains and sub-domains expressed in unidirectional pipes having forks and joins but having no loops according to the method of DUPPL machines. A design process 8B44 may transform a Pipeline 8B43 into blocks of a block diagram language 8B80 that may be converted along with other blocks into a bitmap personality of a WBM FPGA.

A further analysis 8B24 of HTML Objects 8B23 may result in circuits 8B25 checking variable memory blocks of a DUPPL machine WBM for conformance to a given Domain. Domain checking circuits 8B25 may check for conformance to WBM Domains TCP IP, HTML, HTML sub-Domains (e.g. JavaScript), and Display, for example. An associated analysis 8B26 of domain objects 8B23 may result in: a differentiation between values to be stored in constant memory blocks of Read Only Memory (ROM), such as the constant symbols <title>, display, and the contents of a Web Page; a differentiation from variable symbols for TCP IP Packets and text received from such packets as extracted by various pipe segments of a TOP pipeline. A design process 8B29 may transform a constants and variables 8B27 into blocks of a block diagram language 8B80 that may be converted along with other blocks into a bitmap personality of a WBM FPGA.

FIG. 9A WBM Apparatus Example: Sports-Related Example

FIG. 9A illustrates a Web Browser Experience 9A00 resulting from, for example, the application of the method of FIG. 8B to a specification 2B100. An application may comprise a domain-specific WBM for the domain of web browsing experience. A user may browse to any number of sites, some of which contain malware. A WBM may accept an HTML page 9A10 from a server at an IP address (e.g., 162.239.31.72); a machine may include an arrow 9A20 of pipes that may validate an HTML page according to the method of FIG. 6; accordingly a user may observe a sports web page advertising tickets for the Olympics on sale for one day only. A gif image of a runner 9A40 may be infected by malware of some unknown type, termed in the art a zero-day attack, in a legitimate sports site, termed a watering hole attack of an APT. A machine may include an arrow 9A30 of pipes that may display graphics, sound, and other multimedia content for display according to valid HTML 9A20, expressing a web page in local display memory 9A40 according to the arrows 1A20, 1A40, and 1A60 of FIG. 1 having logic according to the method of FIGS. 4A, 4B, and 4C; and, via its circuitry, a machine may express a web page on a display 9A40 via the interpretation of HTML 9A10 and its various tags and sub-domains. A display may be built according to the use of TCP messages between a WBM and a server by which a WBM may obtain graphics for display. A display may be viewed according to the position of a mouse 1B33 of FIG. 1B within the coordinates of pixels according to logic of pipes mapping mouse movement of a Mouse Domain to changes of coordinates of a Display Domain.

A symbol 9A40 noted as "Display" may comprise a fixed sequence of text as a header "MegaSports Inc" at 9A40 expressing a web page of a company named MegaSports Inc. A Display 9A40 may have a message body as "Olympics Tickets on Sale! Half price One Day Only" that may comprise a mapping of an HTML <body> to a location of a Display 9A40. An image of a runner at 9A40 may be encoded into a gif format (or other format) that allows the embedding of code into the image. A sequence of embedded code may contain malware of an unknown type. An Images Domain (embodied in the WBM as circuitry similar to the CHAR domain of FIG. 3B, but specifying what is acceptable in an image) may allow images but not allow code in a gif image. A fault generated by the code embedded in the runner image may cause fault management circuitry 1A80 to process the unauthorized characters. For example, the fault management circuitry 1A80 may determine that the unauthorized characters is likely or potentially to be malware by analyzing the type of data being processed and the unauthorized characters (e.g., if the type of data is an image and one of the unauthorized characters is a null character, the unauthorized characters may be associated with malware) and/or by comparing the unauthorized characters to one or more malware signatures to determine whether the code is potentially malware. The fault management circuitry 1A80 may remove the unauthorized characters from the data stored by the WBM (e.g., delete the data from any memory blocks). Additionally, the fault management circuitry 1A80 may insert an advisory message at the bottom of the Display 9A40 to indicate that potential malware was removed. Removing the unauthorized characters from the data stored by the WBM may prevent the unauthorized characters from being further processed. There may be other ways to prevent the unauthorized characters from being further processed (e.g., by setting one or more internal flags indicating that certain symbols are not to be processed, deleting the unauthorized characters only from output data, etc.). In addition, in some variations, the WBM may remove the unauthorized characters without determining that the unauthorized characters are potentially malware. In this way, the WBM can restrict content to only the authorized characters. In some embodiments, memory of a WBM may be allocated specifically to each piece of content that is received from a specific server.

Figure 9B:
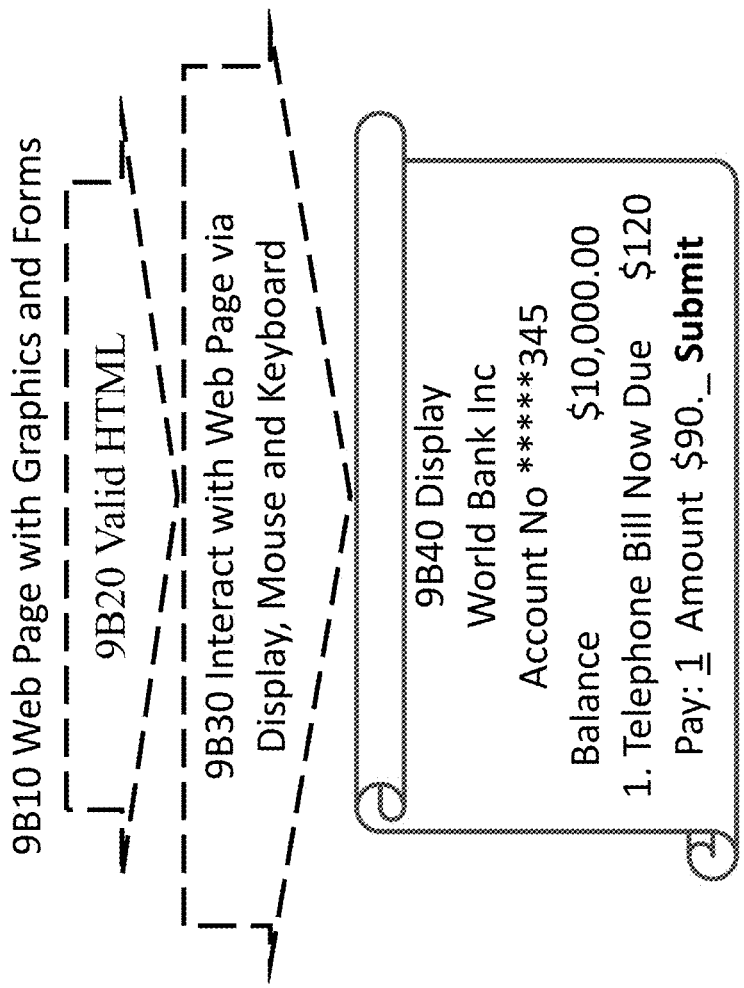
FIG. 9B illustrates a generalized flow chart of a WBM that receives an HTML page from a bank and responds without introducing APT malware into the bank's network

FIG. 9B WBM Apparatus Example: Banking-Related Example

FIG. 9B illustrates a Web Browser Experience 9B00 resulting from, for example, the user of WBM of FIG. 9A for on-line banking. A user may click on a button of a display generated by the WBM to cause the WBM to send a request for a web page of the user's bank. A WBM may exchange credentials with the bank according to the bank's protocol (e.g. learned by a WBM according to its fault recovery machine learning capability of a DUPPL machine). A WBM may accept an HTML page 9B10 from a server at the bank's IP address. A domain of Account Numbers may suppress all but the last three digits of the user's account number for display even though the full Account Number was sent from the bank and validated by the WBM. The WBM may generate a display according to the user's preferences that Account Numbers not be displayed. A user may select a bill to pay, specify an amount (the full amount is in dispute), and conclude the banking experience.

To contrast the user experience described in connection with FIGS. 9A and 9B with software-based web browsers in a home computer, laptop, or smart phone, one may observe several differences. APT malware first disables the victim's security services and then implants itself in the browser where it collects login credentials, bank account numbers, and other information that is valuable on the cyber black market. In 9A, the zero-day malware could not 'drop' into the victim operating system because the WBM has no OS. Therefore, instead of defeating the browser's security software, the zero-day code was detected hiding in a gif image. In a conventional software-based web browser, the zero-day code would have hidden in the browser, waiting for the user to log in for online banking. Thus, advanced previously unknown malware would have acquired the user's login credentials and may have infected the bank. Some time later, the malware may have used the login credentials to transfer funds from the user's bank account. In the web browsing experience of FIG. 9B, however, no such theft of credentials is logically or physically possible because malware does not conform to the WBM's predefined Domains that enable legitimate uses but make unauthorized uses impossible. In addition, sophisticated malware cannot turn off the WBM's resistance to malware because it is hardwired into the WBM's Domains. FIG. 10A explains this further.

FIG. 10A, A Conventional Mechanization of a Web Browser Display Function

FIG. 10A illustrates the time line of operation of a web browser software application 10A00 on a general purpose computer having an operating system (OS) and web browser display function realized in software on a contemporary von Neumann central processing unit (CPU) having an instruction set architecture (ISA) with registers and a random access memory (RAM). The time line across the top of FIG. 10A illustrates how a conventional computer executes a web browser application, each step in sequence. At each time T1, T2, etc. the operating system (OS) and applications share various instruction registers of various CPUs, saving persistent information in a large shared RAM that may be more permanently stored on non-volatile memory such as a hard drive.

A web browser software application 10A00 may share cache memory 10A10 among Interrupt Service Routines (ISR), OS threads, and register data, while main memory 10A20 is shared among lower level functions such as Ethernet packet processing to extract data, HTML parsing to recognize how to form a web page, and transfer to display data into pixels for display memory that may be embodied in a Graphics Processor Unit (GPU) in which computing functions such as generating texture may be achieved. At the same time, as is widely understood, main memory, cache, and hard drives also provide space for the storage of malware; since the execution of malware may not be detected, a CPU may perform malware functions such as stealing credit card data and log-in credentials via Man in the Browser attacks from shared memory 10A20.

A web browser software application 10A00 may consume a certain amount of power through the operation of its CPU, RAM, hard drive, and other computing and communications components.

FIG. 10B WBM Mechanization of a Web Browser Display Function

In contrast to a conventional computer, a WBM comprises hardware having a timing diagram 10B00 showing the timing of pipes of hard wired logic, e.g. that form packets from the signals received at an Ethernet cable; having hard wired logic of pipes that extract messages from such packets; having hard wired logic of pipes that recognize HTML <title> that may comprise the contents of a memory block 10B10 used exclusively to store HTML tags for validation and mapping to an HTML display domain memory 10B20 in which a title of a document may be expressed in order to be mapped to a Display Hardware domain 10B30 of display hardware; hard wired logic of pipes that generate display 10B30 of web content previously stored in 10B10, received in a form of packets at an Ethernet cable at 1A01 in FIG. 1. Thus, WBM timing diagram 10B00 illustrates the timing of the transformation of data from various special-purpose memory blocks 10B10, 10B20 and 10B30 in order to achieve the WBM function of the browsing experience.

A WBM 10B00 requires no shared registers of a machine 10A00 since each variable 1B10, 1B20, 1B30, etc., may be represented in its own variable object memory block of a given pipe and the value of the variable object may be constrained by domains hardcoded into the WBM.

A WBM 10B00 may consume a certain amount of power through the operation of its pipes and related communications components; on a per-transaction basis, the total power dissipated by a WBM 10B00 described in FIGS. 1A through 10B may be significantly less than that of a conventional computing machine performing web browser applications in software, 10A00. A WBM 10B00 therefore may be termed a green computing machine.

Since timing diagram 10B00 is illustrative of all processing performed in a WBM, there is no memory or processing that may is available "randomly;" therefore there is no place for malware to be stored in a WBM; there are no pipes that are physically capable of providing processing to malware since each pipe processes only the type of data of a Domain specified at its input to become a type of data of a Domain specified at its output. Since Domains are data elements (not "code" that may be executed) as specified in terms of symbol notation 2B, malware may not be present in WBM Domain of memory blocks 10B10, 10B20, 10B30 and memory blocks specified according to methods of FIGS. 8A and 8B. Pipes and arrows realizing timing diagram 10B comprise logic for validating domain membership and for mapping between Domains, but have no other computational capability. Therefore, it is physically impossible for malware to exist or to be processed in a WBM. Malware may infect random access memory (RAM) of a general purpose computer. In contrast, a WBM retains information in the isolated memory blocks that cannot be randomly accessed. Indeed, the memory blocks of a WBM can only be accessed via hardware of pipes that perform various functions such as validation checks on symbols as they are passed through the pipe circuitry. As a result of a validation, any such memory block may contain only validated results that satisfy the constraints of the hard-coded domains of the application being implemented in the WBM. Thus, the circuits of a WBM may prove much more resistant to software and network-based malware that uses RAM, and in some cases impervious to the types of malware that prey on computers having RAM.

I claim:

1. A domain-specific symbolic web browser apparatus comprising:
   first circuitry configured to receive image or textual data associated with a web page;
   second circuitry configured to generate, based on the image or textual data, a first symbol and a second symbol;
   third circuitry configured to:
      determine that a value of the first symbol is valid according to a first domain, wherein the first domain is one of a plurality of domains embedded into hardware of the domain specific symbolic web browser apparatus, wherein the first domain includes, via a hardwired symbolic notation, values that the image or textual data is allowed to have, and determine that a value of the second symbol is not valid according to the first domain;
   fourth circuitry configured to;
      based on determining that the value of the second symbol is not valid, compare the value of the second symbol to one or more indications of malware to determine that the second symbol is associated with malware, and
      based on determining that the second symbol is associated with malware, prevent the second symbol from being processed for display and cause deletion of the second symbol from one or more memory blocks of the domain-specific symbolic web browser apparatus; and
   fifth circuitry configured to generate display data based on the first symbol and output the display data for display.

2. The domain-specific symbolic web browser apparatus of claim 1, wherein the domain-specific symbolic web browser apparatus has no registers; no central processing unit (CPU); no Random Access Memory (RAM); no instruction registers; no Instruction Set Architecture (ISA); has no operating system (OS); and has no applications programming.

3. The domain-specific symbolic web browser apparatus of claim 1, wherein the display data includes a representation of the web page.

4. The domain-specific symbolic web browser apparatus of claim 1, wherein the first domain is for images, and lists data values that an image is allowed to have.

5. The domain-specific symbolic web browser apparatus of claim 1, wherein the first domain is for textual data, and lists data values that text data is allowed to have.

6. The domain-specific symbolic web browser apparatus of claim 1, further comprising: sixth circuitry configured to store a computational self-description of the domain-specific symbolic web browser apparatus, wherein the computational self-description provides a description of what the domain-specific symbolic web browser apparatus is configured to perform.

7. The domain-specific symbolic web browser apparatus of claim 1, wherein the display data includes an indication that potential malware was removed from the web page.

8. The domain-specific symbolic web browser apparatus of claim 1 embodied in one or more field-programmable gate arrays (FPGA) or one or more application-specific integrated circuits (ASIC).

9. An apparatus comprising:
   one or more field programmable gate arrays programmed, via one or more field programmable gate array (FPGA) images, to cause the apparatus to:
      receive image or textual data associated with a web page;
      generate, based on the image or textual data, a first symbol and a second symbol;
      determine that a value of the first symbol is valid according to a first domain, wherein the first domain is one of a plurality of domains embedded into hardware of the apparatus,
      wherein the first domain includes, via a hardwired symbolic notation, values that the image or textual data is allowed to have;
      determine that a value of the second symbol is not valid according to the first domain;
      based on determining that the value of the second symbol is not valid, compare the value of the second symbol to one or more indications of malware to determine that the second symbol is associated with malware,
      based on determining that the second symbol is associated with malware, prevent the second symbol from being processed for display and cause deletion of the second symbol from one or more memory blocks of the domain-specific symbolic web browser apparatus; and
      generate display data based on the first symbol and output the display data for display.

10. The apparatus of claim 9, wherein the apparatus has no registers; no central processing unit (CPU); no Random Access Memory (RAM); no instruction registers; no Instruction Set Architecture (ISA); has no operating system (OS); and has no applications programming.

11. The apparatus of claim 9, wherein the display data includes a representation of the web page.

12. The apparatus of claim 9, wherein the first domain is for images, and lists data values that an image is allowed to have.

13. The apparatus of claim 9, wherein the first domain is for textual data, and lists data values that text data is allowed to have.

14. The apparatus of claim 9, wherein the one or more field programmable gate arrays are programmed, via the one or more FPGA images, to cause the apparatus to:
   store a computational self-description of a domain-specific symbolic web browser apparatus, wherein the computational self-description provides a description of what the domain specific symbolic web browser apparatus is configured to perform.

15. The apparatus of claim 9, wherein the display data includes an indication that potential malware was removed from the web page.

16. The apparatus of claim 9, wherein the one or more field programmable gate arrays are programmed, via the one or more FPGA images, to cause the apparatus to generate, based on the value of the second symbol being not valid according to the first domain, a fault condition;
   wherein the one or more field programmable gate arrays are programmed, via the one or more FPGA images, to cause the apparatus to compare the value of the second symbol to the one or more indications of malware based on the fault condition;
   and wherein the one or more indications of malware include one or more malware signatures.

17. The domain-specific symbolic web browser apparatus of claim 1, wherein the third circuitry is configured to:
- generate, based on the value of the second symbol being not valid according to the first domain, a fault condition, and
- send, to the fourth circuitry, the fault condition;
- wherein the fourth circuitry is configured to compare the value of the second symbol to the one or more indications of malware based on the fourth circuitry receiving the fault condition; and
- wherein the one or more indications of malware include one or more malware signatures.

18. A method comprising:
- configuring, based on one or more field programmable gate array (FPGA) images, one or more FPGAs as a domain-specific symbolic web browser apparatus by at least:
- configuring first circuitry of the one or more FPGAs to receive image or textual data associated with a web page;
  - configuring second circuitry of the one or more FPGAs to generate, based on the image or textual data, a first symbol and a second symbol;
  - configuring third circuitry of the one or more FPGAs to:
    - determine that a value of the first symbol is valid according to a first domain, wherein the first domain is one of a plurality of domains embedded into hardware of the domain-specific symbolic web browser apparatus, wherein the first domain includes, via a hardwired symbolic notation, values that the image or textual data is allowed to have, and
    - determine that a value of the second symbol is not valid according to the first domain;
  - configuring fourth circuitry of the one or more FPGAs to:
    - based on determining that the value of the second symbol is not valid, compare the value of the second symbol to one or more indications of malware to determine that the second symbol is associated with malware, and
    - based on determining that the second symbol is associated with malware, prevent the second symbol from being processed for display and cause deletion of the second symbol from one or more memory blocks of the domain-specific symbolic web browser apparatus; and
  - configuring fifth circuitry of the one or more FPGAs to generate display data based on the first symbol and output the display data for display.

19. The method of claim 18, wherein the display data includes an indication that potential malware was removed from the web page.

20. The method of claim 18, wherein configuring the one or more FPGAs as the domain-specific symbolic web browser apparatus is performed by at least:
- further configuring the third circuitry to:
- generate, based on the value of the second symbol being not valid according to the first domain, a fault condition, and
- send, to the fourth circuitry, the fault condition;
- further configuring the fourth circuitry to compare the value of the second symbol to the one or more indications of malware based on the fourth circuitry receiving the fault condition; and
- wherein the one or more indications of malware includes one or more malware signatures.

* * * * *

UNITED STATES PATENT AND TRADEMARK OFFICE
CERTIFICATE OF CORRECTION

PATENT NO. : 10,956,572 B2
APPLICATION NO. : 15/682101
DATED : March 23, 2021
INVENTOR(S) : Mitola, III Page 1 of 1

It is certified that error appears in the above-identified patent and that said Letters Patent is hereby corrected as shown below:

On the Title Page

Page 2, Column 2, item (56) under Other Publications, Line 13:
Please delete "Magdalene" and insert --Magdaleno--

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*